(12) United States Patent
Kessler et al.

(10) Patent No.: US 9,684,606 B2
(45) Date of Patent: Jun. 20, 2017

(54) TRANSLATION LOOKASIDE BUFFER INVALIDATION SUPPRESSION

(71) Applicant: Cavium, Inc., San Jose, CA (US)

(72) Inventors: Richard Eugene Kessler, Northborough, MA (US); Shubhendu Sekhar Mukherjee, Southborough, MA (US); Mike Bertone, Marlborough, MA (US)

(73) Assignee: CAVIUM, INC., San Jose, CA (US)

( * ) Notice: Subject to any disclaimer, the term of this patent is extended or adjusted under 35 U.S.C. 154(b) by 173 days.

(21) Appl. No.: 14/541,726

(22) Filed: Nov. 14, 2014

(65) Prior Publication Data
US 2016/0140051 A1 May 19, 2016

(51) Int. Cl.
*G06F 12/00* (2006.01)
*G06F 13/00* (2006.01)
*G06F 13/28* (2006.01)
*G06F 12/1045* (2016.01)
*G06F 3/06* (2006.01)

(52) U.S. Cl.
CPC ........ *G06F 12/1045* (2013.01); *G06F 3/0604* (2013.01); *G06F 3/0634* (2013.01); *G06F 3/0683* (2013.01); *G06F 2212/50* (2013.01); *G06F 2212/62* (2013.01); *G06F 2212/682* (2013.01); *G06F 2212/683* (2013.01)

(58) Field of Classification Search
CPC ............. G06F 12/1027; G06F 12/1036; G06F 2212/683; G06F 12/1009; G06F 2212/682; G06F 12/1081; G06F 9/30058; G06F 9/3867

USPC ........................................................ 711/119
See application file for complete search history.

(56) References Cited

U.S. PATENT DOCUMENTS

| | | | | |
|---|---|---|---|---|
| 4,779,188 A | * | 10/1988 | Gum | G06F 9/4843 711/E12.061 |
| 4,980,816 A | | 12/1990 | Fukuzawa | |
| 5,437,017 A | * | 7/1995 | Moore | G06F 12/1027 709/213 |
| 5,497,480 A | * | 3/1996 | Hayes | G06F 12/0831 711/166 |

(Continued)

OTHER PUBLICATIONS

Agarwal et al., "The MIT Alewife Machine" Proceedings of the IEEE, 87(3): 430-444, 1999.

(Continued)

*Primary Examiner* — Sheng-Jen Tsai
(74) *Attorney, Agent, or Firm* — Occhiuti & Rohlicek LLP

(57) ABSTRACT

Managing a plurality of translation lookaside buffers (TLBs) includes: issuing, at a first processing element, a first instruction for invalidating one or more TLB entries associated with a first context in a first TLB associated with the first processing element. The issuing includes: determining whether or not a state of an indicator indicates that all TLB entries associated with the first context in a second TLB associated with a second processing element are invalidated; if not: sending a corresponding instruction to the second processing element, causing invalidation of all TLB entries associated with the first context in the second TLB, and changing a state of the indicator; and if so: suppressing sending of any corresponding instructions for causing invalidation of any TLB entries associated with the first context in the second TLB to the second processing element.

24 Claims, 16 Drawing Sheets

(56) References Cited

U.S. PATENT DOCUMENTS

| Patent/Pub. No. | Date | Inventor | Classification |
|---|---|---|---|
| 5,764,944 A | 6/1998 | Hwang | |
| 5,826,057 A * | 10/1998 | Okamoto | G06F 12/109 703/24 |
| 5,890,189 A * | 3/1999 | Nozue | G06F 12/109 711/100 |
| 5,893,152 A | 4/1999 | Fuller | |
| 5,906,001 A * | 5/1999 | Wu | G06F 12/1036 711/141 |
| 5,956,754 A * | 9/1999 | Kimmel | G06F 12/1036 711/206 |
| 6,105,113 A | 8/2000 | Schimmel | |
| 6,119,204 A * | 9/2000 | Chang | G06F 12/1027 711/141 |
| 6,212,613 B1 * | 4/2001 | Belair | G06F 12/1027 711/207 |
| 6,260,131 B1 | 7/2001 | Kikuta | |
| 6,370,632 B1 | 4/2002 | Kikuta | |
| 6,453,387 B1 | 9/2002 | Lozano | |
| 6,604,187 B1 * | 8/2003 | McGrath | G06F 12/1036 711/209 |
| 6,779,085 B2 * | 8/2004 | Chauvel | G06F 1/206 711/135 |
| 7,073,043 B2 | 7/2006 | Arimilli et al. | |
| 7,222,221 B1 * | 5/2007 | Agesen | G06F 9/45537 707/999.2 |
| 7,617,378 B2 | 11/2009 | Arimilli et al. | |
| 7,853,754 B1 | 12/2010 | Agarwal et al. | |
| 7,865,670 B2 * | 1/2011 | Cota-Robles | G06F 12/1036 711/133 |
| 8,392,661 B1 | 3/2013 | Metcalf | |
| 9,317,443 B2 * | 4/2016 | Bybell | G06F 12/1045 |
| 9,330,023 B2 * | 5/2016 | Bybell | G06F 12/1045 |
| 2002/0078308 A1 * | 6/2002 | Altman | G06F 12/1027 711/147 |
| 2002/0087614 A1 * | 7/2002 | Kocev | G06F 13/24 718/104 |
| 2004/0215898 A1 | 10/2004 | Arimilli | |
| 2004/0230749 A1 * | 11/2004 | Slegel | G06F 9/30047 711/144 |
| 2005/0080934 A1 * | 4/2005 | Cota-Robles | G06F 12/1036 710/1 |
| 2006/0085599 A1 * | 4/2006 | Woffinden | G06F 9/3812 711/125 |
| 2006/0230252 A1 * | 10/2006 | Dombrowski | G06F 12/1027 711/205 |
| 2007/0005932 A1 * | 1/2007 | Covelli | G06F 12/1027 711/207 |
| 2007/0061547 A1 * | 3/2007 | Jordan | G06F 12/1027 711/207 |
| 2007/0061548 A1 * | 3/2007 | Jordan | G06F 12/1027 711/207 |
| 2007/0156969 A1 | 7/2007 | Tian | |
| 2008/0140897 A1 | 6/2008 | Ganguly | |
| 2009/0037906 A1 * | 2/2009 | Armstrong | G06F 12/1475 718/1 |
| 2010/0100685 A1 * | 4/2010 | Kurosawa | G06F 12/1054 711/128 |
| 2010/0332786 A1 * | 12/2010 | Grohoski | G06F 9/3851 711/207 |
| 2010/0332787 A1 * | 12/2010 | Grohoski | G06F 12/1027 711/207 |
| 2011/0153952 A1 * | 6/2011 | Dixon | G06F 12/1009 711/135 |
| 2011/0161619 A1 | 6/2011 | Kaminski | |
| 2011/0161620 A1 | 6/2011 | Kaminski | |
| 2011/0231593 A1 * | 9/2011 | Yasufuku | G06F 12/1027 711/3 |
| 2011/0238947 A1 * | 9/2011 | Nishiguchi | G06F 12/1036 711/207 |
| 2012/0089811 A1 | 4/2012 | Sawai | |
| 2013/0339656 A1 * | 12/2013 | Greiner | G06F 12/1009 711/207 |
| 2013/0339657 A1 * | 12/2013 | Greiner | G06F 9/30043 711/207 |
| 2014/0040562 A1 * | 2/2014 | Koka | G06F 12/10 711/141 |
| 2014/0052917 A1 | 2/2014 | Koka et al. | |
| 2014/0059320 A1 * | 2/2014 | Bennett | G06F 12/1009 711/206 |
| 2014/0115297 A1 * | 4/2014 | Cain, III | G06F 12/1027 711/207 |
| 2014/0189285 A1 * | 7/2014 | Conrad | G06F 12/1027 711/207 |
| 2014/0223141 A1 * | 8/2014 | Combs | G06F 12/1036 712/207 |
| 2014/0325167 A1 * | 10/2014 | Slegel | G06F 12/0891 711/159 |
| 2015/0058522 A1 | 2/2015 | Armstrong | |
| 2015/0089116 A1 * | 3/2015 | Chin | G06F 12/1027 711/6 |
| 2015/0089147 A1 * | 3/2015 | Snyder, II | G06F 12/0808 711/135 |
| 2015/0089150 A1 * | 3/2015 | Kessler | G06F 12/1045 711/139 |
| 2015/0089184 A1 * | 3/2015 | Mukherjee | G06F 12/1036 711/206 |
| 2015/0100753 A1 * | 4/2015 | Shen | G06F 12/1027 711/207 |
| 2015/0242319 A1 * | 8/2015 | Evans | G06F 12/0833 711/207 |
| 2015/0301949 A1 * | 10/2015 | Koka | G06F 12/10 711/147 |
| 2015/0301951 A1 * | 10/2015 | Bybell | G06F 12/1027 711/207 |
| 2015/0301953 A1 * | 10/2015 | Bybell | G06F 12/1045 711/207 |
| 2015/0370592 A1 * | 12/2015 | Tuch | G06F 9/45558 718/1 |
| 2016/0041922 A1 * | 2/2016 | Parks | G06F 12/1036 711/207 |
| 2016/0140040 A1 | 5/2016 | Mukherjee | |
| 2016/0140047 A1 * | 5/2016 | Mukherjee | G06F 12/1027 711/207 |

OTHER PUBLICATIONS

Stevens, A. "Introduction to AMBA® 4 ACE™ and big.Little™ Processing Technology" Copyright2011-2013, p. 1-15.

Villavieja et al., "DiDi: Mitigating the Performance Impact of TLB Shootdowns Using a Shared TLB Directory".

Ramaswamy, S. "Optimizing Directory-Based Cache Coherence on the RAW Architecture", Massachusetts Institute of Technology, 2005.

* cited by examiner

TRANSLATION LOOKASIDE BUFFER INVALIDATION SUPPRESSION

BACKGROUND

This invention relates to management of translation lookaside buffers in computing systems.

Many computing systems utilize virtual memory systems to allow programmers to access memory addresses without having to account for where the memory addresses reside in the physical memory hierarchies of the computing systems. To do so, virtual memory systems maintain a mapping of virtual memory addresses, which are used by the programmer, to physical memory addresses that store the actual data referenced by the virtual memory addresses. The physical memory addresses can reside in any type of storage device (e.g., SRAM, DRAM, magnetic disk, etc.).

When a program accesses a virtual memory address, the virtual memory system performs an address translation to determine which physical memory address is referenced by the virtual memory address. The data stored at the determined physical memory address is read from the physical memory address, as an offset within a memory page, and returned for use by the program. The virtual-to-physical address mappings are stored in a "page table." In some cases, the virtual memory address may be located in a page of a large virtual address space that translates to a page of physical memory that is not currently resident in main memory (i.e., a page fault), so that page is then copied into main memory.

Modern computing systems include one or more translation lookaside buffers (TLBs) which are caches for the page table, used by the virtual memory system to improve the speed of virtual to physical memory address translation. Very generally, a TLB includes a number of entries from the page table, each entry including a mapping from a virtual address to a physical address. In general, the entries of the TLB cover only a portion of the total memory available to the computing system. In some examples, the entries of the TLB are maintained such that the portion of the total available memory covered by the TLB includes the most recently accessed, most commonly accessed, or most likely to be accessed portion of the total available memory.

SUMMARY

In one aspect, in general, a method for managing a plurality of translation lookaside buffers, each translation lookaside buffer including a plurality of translation lookaside buffer entries and being associated with a corresponding processing element of a plurality of processing elements, includes: issuing, at a first processing element of the plurality of processing elements, a first instruction for invalidating one or more translation lookaside buffer entries associated with a first context in a first translation lookaside buffer associated with the first processing element. The issuing includes: determining, at the first processing element, whether or not a state of an indicator indicates that all translation lookaside buffer entries associated with the first context in a second translation lookaside buffer associated with a second processing element are invalidated; if the state of the indicator indicates that all translation lookaside buffer entries associated with the first context in the second translation lookaside buffer are not invalidated: sending a corresponding instruction to the second processing element of the plurality of processing elements, the corresponding instruction causing invalidation of all translation lookaside buffer entries associated with the first context in the second translation lookaside buffer, and changing a state of the indicator to indicate that all translation lookaside buffer entries associated with the first context in the second translation lookaside buffer are invalidated; and if the state of the indicator indicates that all translation lookaside buffer entries associated with the first context in the second translation lookaside buffer associated with the second processing element are invalidated: suppressing sending of any corresponding instructions for causing invalidation of any translation lookaside buffer entries associated with the first context in the second translation lookaside buffer to the second processing element.

Aspects can include one or more of the following features.

The method further includes: prior to determining whether or not the state of the indicator indicates that all translation lookaside buffer entries associated with the first context in the second translation lookaside buffer are invalidated, determining whether a second context associated with the indicator is the same as the first context associated with the first instruction; and if the second context differs from the first context, changing the state of the indicator to indicate that all translation lookaside buffer entries associated with the first context in the second translation lookaside buffer are not invalidated.

The method further includes issuing a synchronization instruction at the first processing element, the synchronization instruction causing any pending translation lookaside buffer invalidation instructions at the first processing element to complete and, upon their completion, changing the state of the indicator to indicate that all translation lookaside buffer entries associated with the first context in the second translation lookaside buffer are not invalidated.

The method further includes determining, at the first processing element, whether or not a state of the indicator indicates that all translation lookaside buffer entries associated with the first context in a plurality of other translation lookaside buffers corresponding to a plurality of other processing elements of the plurality of processing elements are invalidated; and if the state of the indicator indicates that all translation lookaside buffer entries associated with the first context in the plurality of other translation lookaside buffers are not invalidated, sending the corresponding instruction to the plurality of other processing elements, the corresponding instruction causing invalidation of all translation lookaside buffer entries associated with the first context in the plurality of other translation lookaside buffers; and if the state of the indicator indicates that all translation lookaside buffer entries associated with the first context in the plurality of other translation lookaside buffers are invalidated: suppressing sending of any corresponding instructions for causing invalidation of any translation lookaside buffer entries associated with the first context in the plurality of other translation lookaside buffers to the second processing element.

The method further includes generating the corresponding instruction including converting the first instruction for invalidating one or more translation lookaside buffer entries associated with the first context in the first translation lookaside buffer to the corresponding instruction for causing invalidation of all translation lookaside buffer entries associated with the first context in the second translation lookaside buffer.

The state of the indicator is represented using a single bit.

The first context includes an address space identifier (ASID).

The first context includes a virtual machine identifier (VMID).

The first context includes an exception level (EL).

The first context includes a state of an SCR_EL3.NS bit.

The method further includes receiving a synchronization message and changing the state of the indicator to indicate that all translation lookaside buffer entries associated with the first context in the second translation lookaside buffer are not invalidated in response to the synchronization message.

The method further includes receiving an interrupt and changing the state of the indicator to indicate that all translation lookaside buffer entries associated with the first context in the second translation lookaside buffer are not invalidated in response to receiving the interrupt.

In another aspect, in general, an apparatus includes: a plurality of processing elements, each associated with a corresponding translation lookaside buffer, each translation lookaside buffer including a plurality of translation lookaside buffer entries; wherein a first processing element of the plurality of processing elements is configured to issue a first instruction for invalidating one or more translation lookaside buffer entries associated with a first context in a first translation lookaside buffer associated with the first processing element, the issuing including: determining, at the first processing element, whether or not a state of an indicator indicates that all translation lookaside buffer entries associated with the first context in a second translation lookaside buffer associated with a second processing element are invalidated; if the state of the indicator indicates that all translation lookaside buffer entries associated with the first context in the second translation lookaside buffer are not invalidated: sending a corresponding instruction to the second processing element of the plurality of processing elements, the corresponding instruction causing invalidation of all translation lookaside buffer entries associated with the first context in the second translation lookaside buffer, and changing a state of the indicator to indicate that all translation lookaside buffer entries associated with the first context in the second translation lookaside buffer are invalidated; and if the state of the indicator indicates that all translation lookaside buffer entries associated with the first context in the second translation lookaside buffer associated with the second processing element are invalidated: suppressing sending of any corresponding instructions for causing invalidation of any translation lookaside buffer entries associated with the first context in the second translation lookaside buffer to the second processing element.

Aspects can include one or more of the following features.

The issuing further includes, prior to determining whether or not the state of the indicator indicates that all translation lookaside buffer entries associated with the first context in the second translation lookaside buffer are invalidated, determining whether a second context associated with the indicator is the same as the first context associated with the first instruction; and if the second context differs from the first context, changing the state of the indicator to indicate that all translation lookaside buffer entries associated with the first context in the second translation lookaside buffer are not invalidated.

The first processing element is configured to issue a synchronization instruction, the synchronization instruction causing any pending translation lookaside buffer invalidation instructions at the first processing element to complete and, upon their completion, changing the state of the indicator to indicate that all translation lookaside buffer entries associated with the first context in the second translation lookaside buffer are not invalidated.

The first processing element is further configured to: determine whether or not a state of the indicator indicates that all translation lookaside buffer entries associated with the first context in a plurality of other translation lookaside buffers corresponding to a plurality of other processing elements of the plurality of processing elements are invalidated; and if the state of the indicator indicates that all translation lookaside buffer entries associated with the first context in the plurality of other translation lookaside buffers are not invalidated, send the corresponding instruction to the plurality of other processing elements, the corresponding instruction causing invalidation of all translation lookaside buffer entries associated with the first context in the plurality of other translation lookaside buffers; and if the state of the indicator indicates that all translation lookaside buffer entries associated with the first context in the plurality of other translation lookaside buffers are invalidated: suppress sending of any corresponding instructions for causing invalidation of any translation lookaside buffer entries associated with the first context in the plurality of other translation lookaside buffers to the second processing element.

The first processing element is configured to generate the corresponding instruction including converting the first instruction for invalidating one or more translation lookaside buffer entries associated with the first context in the first translation lookaside buffer to the corresponding instruction for causing invalidation of all translation lookaside buffer entries associated with the first context in the second translation lookaside buffer.

The state of the indicator is represented using a single bit.

The first context includes an address space identifier (ASID).

The first context includes a virtual machine identifier (VMID).

The first context includes an exception level (EL).

The first context includes a state of an SCR_EL3.NS bit.

The first processing element is configured to receive a synchronization message and change the state of the indicator to indicate that all translation lookaside buffer entries associated with the first context in the second translation lookaside buffer are not invalidated in response to the synchronization message.

The first processing element is configured to receive an interrupt and change the state of the indicator to indicate that all translation lookaside buffer entries associated with the first context in the second translation lookaside buffer are not invalidated in response to receiving the interrupt.

Aspects can have one or more of the following advantages.

Among other advantages, suppression of the broadcasting of TLBI instructions for mappings whose associated contexts are already invalidated at remote cores reduces the number of TLBI instructions that are broadcast over the processing bus and the number of TLBI acknowledgements that are sent over the processing bus, thereby reducing consumption of bandwidth on the processing bus. Furthermore, the time spent waiting for such a large number of TLBI instructions to complete at the remote processing elements is reduced.

Other features and advantages of the invention will become apparent from the following description, and from the claims.

DESCRIPTION

1 Overview

For a variety of reasons (e.g., a context switch), a mapping between a virtual address and a physical address may become invalid. If the mapping is stored as an entry in a TLB, the entry in the TLB must be invalidated to avoid returning incorrect data to a program that uses the virtual address. In some examples, computing systems provide an instruction for invalidating TLB entries, sometimes referred to as a TLB invalidate instruction (TLBI). When a mapping between a virtual address and a physical address becomes invalid, a TLBI instruction is issued for the mapping. When the TLBI instruction for the mapping is received, any entry in the TLB corresponding to the mapping is invalidated (or removed).

In computing systems with multiple processing elements (e.g., cores of a multi-core processor), numerous TLBI instructions may be sent between the processing elements. The can result in an undesirable consumption of bandwidth on a processing bus. Furthermore, waiting for a large number of TLBI instructions to complete at remote processing elements can incur significant time penalties.

Approaches described herein aim to reduce the number of TLBI instructions that are sent over the processing bus, thereby reducing the adverse effects associated with numerous TLBI instructions.

2 Computing System

Figure 1:
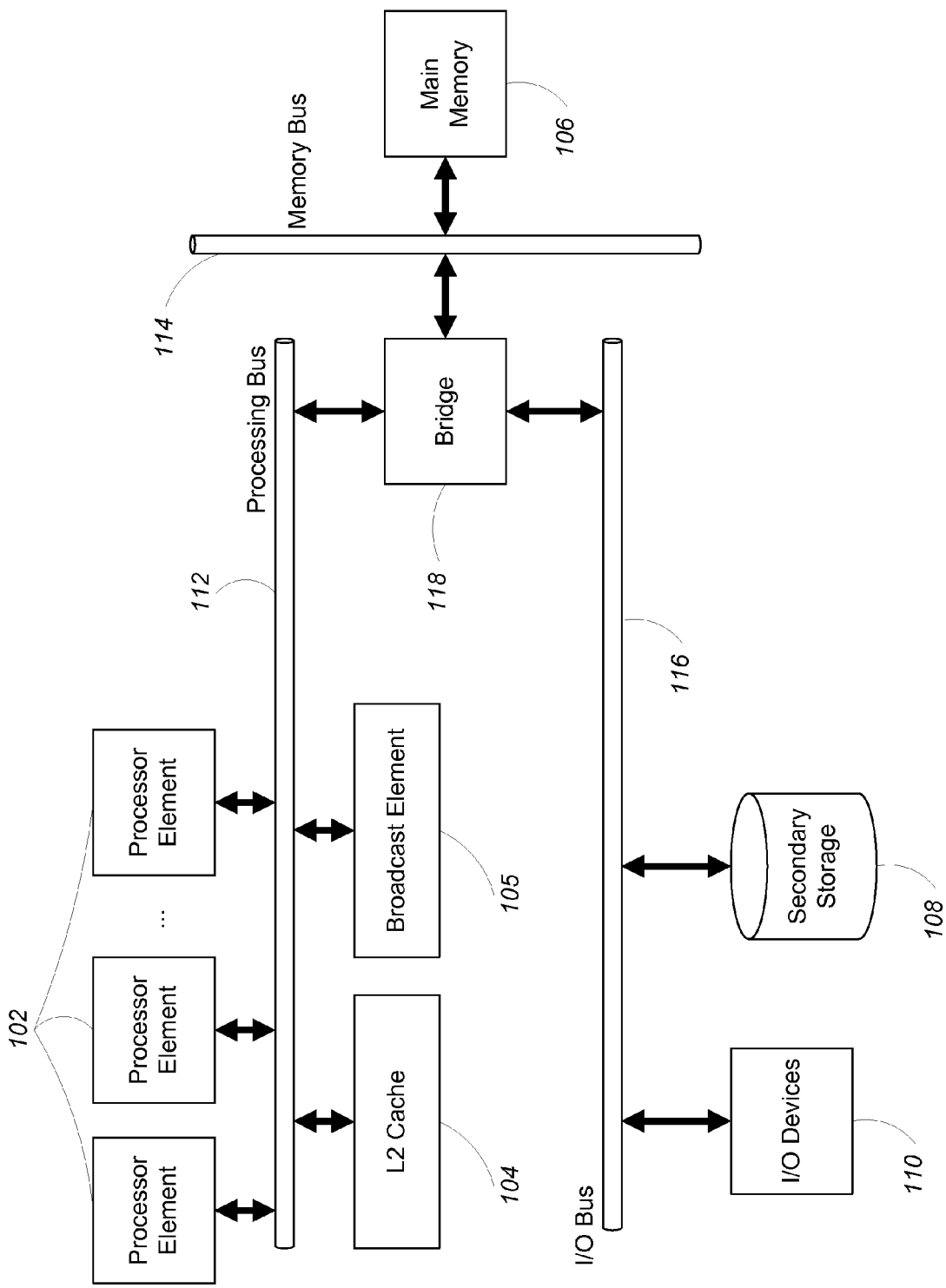
FIG. 1 is a computing system.

Referring to FIG. 1, a computing system 100 includes a number of processing elements 102, a level 2 (L2) cache 104 (e.g., SRAM), a broadcast element 105, a main memory 106 (e.g., DRAM), a secondary storage device (e.g., a magnetic disk) 108, and one or more input/output (I/O) devices 110 (e.g., a keyboard or a mouse). The processing elements 102, the L2 cache 104, and the broadcast element 105 are connected to a processing bus 112, the main memory 106 is connected to a memory bus 114, and the I/O devices 110 and the secondary storage device 108 are connected to an I/O bus 116. The processing bus 112, the memory bus 114, and the I/O bus 116 are connected to one another via a bridge 118.

Very generally, the broadcast element 105 allows for any one of the processor elements 102 to broadcast commands or instructions to other of the processing elements 102 over the processing bus 112.

2.1 Memory Hierarchy

In general, the processing elements 102 execute instructions of one or more computer programs, including reading processor instructions and data from memory included in the computing system 100. As is well known in the art, the various memory or storage devices in the computing system 100 are organized into a memory hierarchy based on a relative latency of the memory or storage devices. One example of such a memory hierarchy has processor registers (not shown) at the top, followed by a level 1 (L1) cache (not shown), followed by the L2 cache 104, followed by the main memory 106, and finally followed by the secondary storage 108. When a given processing element 102 tries to access a memory address, each memory or storage device in the memory hierarchy is checked, in order from the top of the memory hierarchy down, to determine whether the data for the memory address is stored in the storage device or memory device.

For example, for a first processing element 348 of the processing elements 102 to access a memory address for data stored only in the secondary storage device 108, the processing element first determines whether the memory address and data are stored in its L1 cache. Since the memory address and data are not stored in its L1 cache, a cache miss occurs, causing the processor to communicate with the L2 cache 140 via that processing bus 112 to determine whether the memory address and data are stored in the L2 cache 140. Since the memory address and data are not stored in the L2 cache 140, another cache miss occurs, causing the L2 cache 140 to communicate with the main memory 106 via the processing bus 112, bridge 110, and memory bus 118 to determine whether the memory address and data are stored in the main memory 106. Since the memory address and data are not stored in the main memory 106, another miss occurs (also called a "page fault"), causing the main memory 106 to communicate with the secondary storage device 108 via the memory bus 114, the bridge 118, and the I/O bus 116 to determine whether the memory address and data are stored in the secondary storage device 108. Since the memory address and data are stored in the secondary storage device 108, the data is retrieved from the secondary storage device 108 and is returned to the processing element via the I/O bus 116, the bridge 118, and the processing bus 112. The memory address and data maybe cached in any number of the memory or storage devices in the memory hierarchy such that it can be accessed more readily in the future.

2.2 Processing Elements

Figure 2:
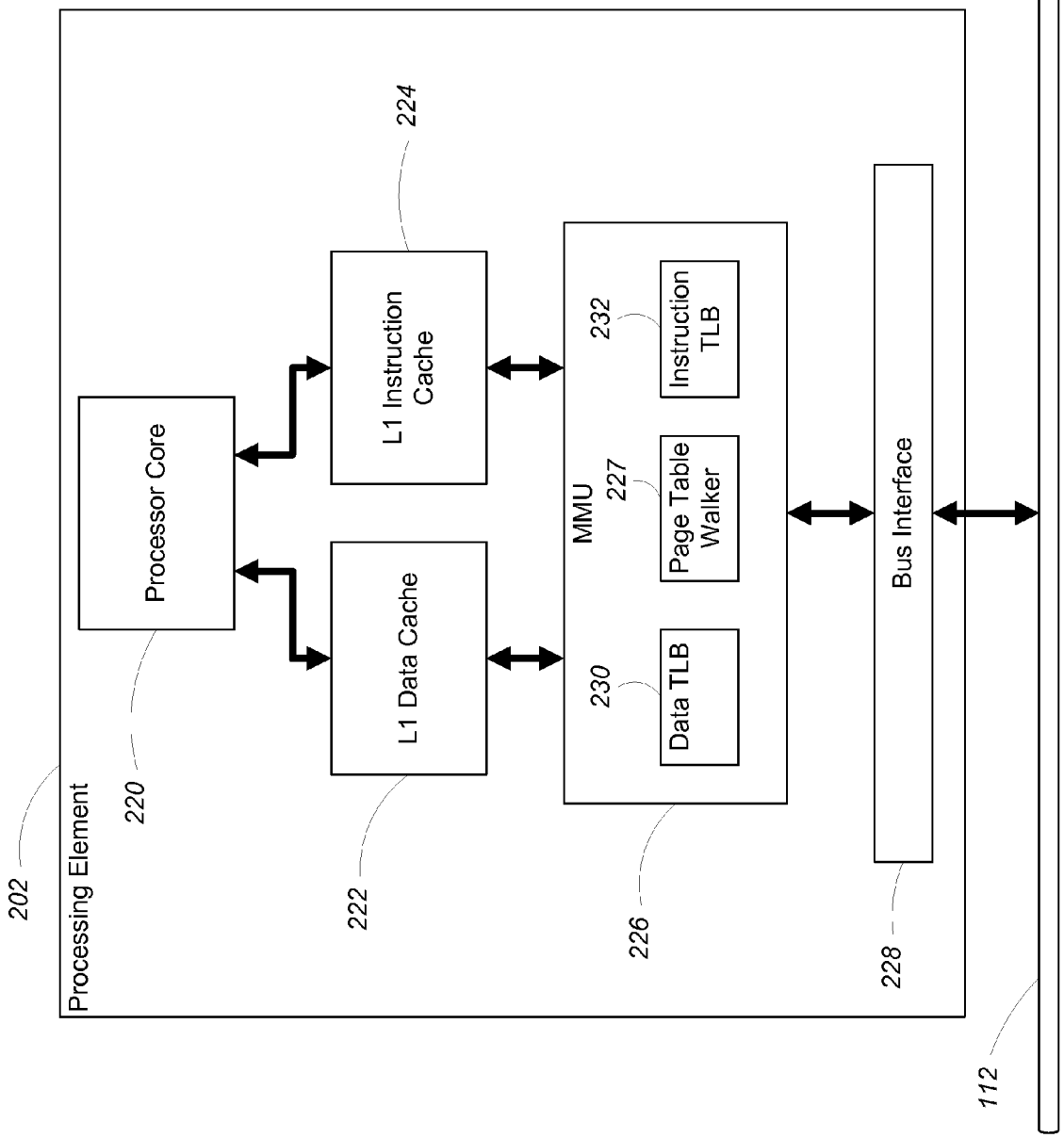
FIG. 2 is a processing element coupled to a processing bus.

Referring to FIG. 2, one example of a processing element 202 of the processing elements 102 of FIG. 1 is connected to the processing bus 112. The processing element 202 includes a processor core 220, an L1 data cache 222, an L1 instruction cache 224, a memory management unit (MMU) 226, and a bus interface 228. The processor core 220 (also called simply a "core") is an individual processor (also called a central processing unit (CPU)) that, together with other processor cores, coordinate to form a multi-core processor. The MMU 226 includes a page table walker 227, a data translation lookaside buffer (TLB) 230, and an instruction translation lookaside buffer (TLB) 232, each of which is described in more detail below.

Very generally, the processor core 220 executes instructions which, in some cases, require access to memory addresses in the memory hierarchy of the computing system 100. The instructions executed by the processing element 202 of FIG. 2 use virtual memory addresses.

2.2.1 Data Memory Access

When the processor core 220 requires access to a virtual memory address associated with data, the processor core 220 sends a memory access request for the virtual memory address to the L1 data cache 222. The L1 data cache 222 stores a limited number of recently or commonly used data values tagged by their virtual memory addresses. If the L1 data cache 222 has an entry for the virtual memory address (i.e., a cache hit), the data associated with the virtual memory address is returned to the processor core 220 without requiring any further memory access operations in the memory hierarchy. Alternatively, in some implementations, the L1 data cache 222 tags entries by their physical memory addresses, which requires address translation even for cache hits.

If the L1 data cache 222 does not have an entry for the virtual memory address (i.e., a cache miss), the memory access request is sent to the MMU 226. In general, the MMU 226 uses the data TLB 230 to translate the virtual memory address to a corresponding physical memory address and sends a memory access request for the physical memory address out of the processor 202 to other elements of the memory hierarchy via the bus interface 228. The page table walker 227 handles retrieval of mappings that are not stored in the data TLB 230, by accessing the full page table that is stored (potentially hierarchically) in one or more levels of memory. The page table stores a complete set of mappings between virtual memory addresses and physical memory addresses that the page table walker 227 accesses to translate the virtual memory address to a corresponding physical memory address.

To speed up the process of translating the virtual memory address to the physical memory address, the data TLB 230 includes a number of recently or commonly used mappings between virtual memory addresses and physical memory addresses. If the data TLB 230 has a mapping for the virtual memory address, a memory access request for the physical memory address associated with the virtual memory address (as determined from the mapping stored in the data TLB 230) is sent out of the processor 202 via the bus interface 228.

If the data TLB 230 does not have a mapping for the for the virtual memory address (i.e., a TLB miss), the page table walker 227 traverses (or "walks") the levels of the page table to determine the physical memory address associated with the virtual memory address, and a memory request for the physical memory address (as determined from the mapping stored in the page table) is sent out of the processor 202 via the bus interface 228.

In some examples, the data TLB 230 and the page table are accessed in parallel to ensure that no additional time penalty is incurred when a TLB miss occurs.

Since the L1 data cache 222 and the data TLB 230 can only store limited number of entries, cache management algorithms are required to ensure that the entries stored in the L1 data cache 222 and the data TLB 230 are those that are likely to be re-used multiple times. Such algorithms evict and replace entries stored in the L1 data cache 222 and the data TLB 230 based on a criteria such a least recently used criteria.

2.2.2 Instruction Memory Access

When the processor core 220 requires access to a virtual memory address associated with processor instructions, the processor core 220 sends a memory access request for the virtual memory address to the L1 instruction cache 224. The L1 instruction cache 224 stores a limited number of processor instructions tagged by their virtual memory addresses. If the L1 instruction cache 224 has an entry for the virtual memory address (i.e., a cache hit), the processor instruction associated with the virtual memory address is returned to the processor core 220 without requiring any further memory access operations in the memory hierarchy. Alternatively, in some implementations, the L1 instruction cache 224 tags entries by their physical memory addresses, which requires address translation even for cache hits.

However, if the L1 instruction cache 224 does not have an entry for the virtual memory address (i.e., a cache miss), the memory access request is sent to the MMU 226. In general, the MMU 226 uses the instruction TLB to translate the virtual memory address to a corresponding physical memory address and sends a memory access request for the physical memory address out of the processor 202 to other elements of the memory hierarchy via the bus interface 228. As is noted above, this translation is accomplished using the page table walker 227, which handles retrieval of mappings between virtual memory addresses and physical memory addresses from the page table.

To speed up the process of translating the virtual memory address to the physical memory address, the instruction TLB 232 includes a number of recently or commonly used mappings between virtual memory addresses and physical memory addresses. If the instruction TLB 232 has a mapping for the virtual memory address, a memory access request for the physical memory address associated with the virtual memory address (as determined from the mapping stored in the instruction TLB 232) is sent out of the processor 202 via the bus interface 228.

If the instruction TLB 232 does not have a mapping for the for the virtual memory address (i.e., a TLB miss), the page table walker 227 walks the page table to determine the physical memory address associated with the virtual memory address, and a memory request for the physical memory address (as determined from the mapping stored in the page table) is sent out of the processor 202 via the bus interface 228.

In some examples, the instruction TLB 232 and the page table are accessed in parallel to ensure that no additional time penalty is incurred when a TLB miss occurs.

Since the L1 instruction cache 224 and the instruction TLB 232 can only store a limited number of entries, cache management algorithms are required to ensure that the mappings stored in the L1 instruction cache 224 and the instruction TLB 232 are those that are likely to be re-used multiple times. Such algorithms evict and replace mappings stored in the L1 instruction cache 224 and the instruction TLB 232 based on a criteria such as a least recently used criteria.

2.3 Translation Lookaside Buffer Invalidation (TLBI) Instructions

In some examples, the computing system's virtual memory system may change its mappings between virtual memory addresses and physical memory addresses. In such cases, translation lookaside buffer invalidation instructions (TLBIs) for the virtual memory addresses are issued (e.g., by an operating system or by a hardware entity) to the TLBs in the computing system (i.e., the data TLB 230 and instruction TLB 232 of each processing element 202).

In some examples, a TLBI instruction includes a virtual memory address and causes invalidation of any TLB entries associated with the virtual memory address. That is, when a TLB receives a TLBI for a given virtual memory address, any entries in the TLB storing mappings between the given virtual memory address and a physical memory address are invalidated. In other examples, a TLBI instruction includes a reference to an entire context and causes invalidation of any TLB entries associated with that context. In computing, a context is essentially a stored state of a process or thread. When a TLB receives a TLBI for a given context, any entries in the TLB storing mappings between virtual memory addresses and physical memory addresses for the context are invalidated. It is noted that, while TLBI instructions generally include a virtual memory address for invalidation as an argument, in some examples, for the sake of simplicity, TLBI instructions are described herein as including a mapping for invalidation as an argument.

2.3.1 Broadcast TLBI Instructions

Furthermore, in some examples, TLBI instructions can be specified as either "local" or "broadcast." When a local TLBI instruction is issued at a given, local processing element, the local TLBI instruction causes invalidation of any TLB entries associated with the virtual memory address or context in the TLB of the given processing element.

When a broadcast TLBI instruction is issued at a given, local processing element, the broadcast TLBI instruction causes invalidation of any TLB entries associated with the virtual memory address or context in the TLB of the local processing element and also causes the TLBI instruction to be sent to one or more other, remote processing elements via the broadcast element. At the one or more remote processing elements, the TLBI instruction issues and causes invalidation of any TLB entries associated with the virtual memory address or context in the TLBs of the one or more remote processing elements. The following is an initial example of how broadcast TLBI instructions would be handled without certain optimizations to be described in more detail in the following sections.

2.3.1.1 Broadcast TLBI Instruction Example

Figure 3:
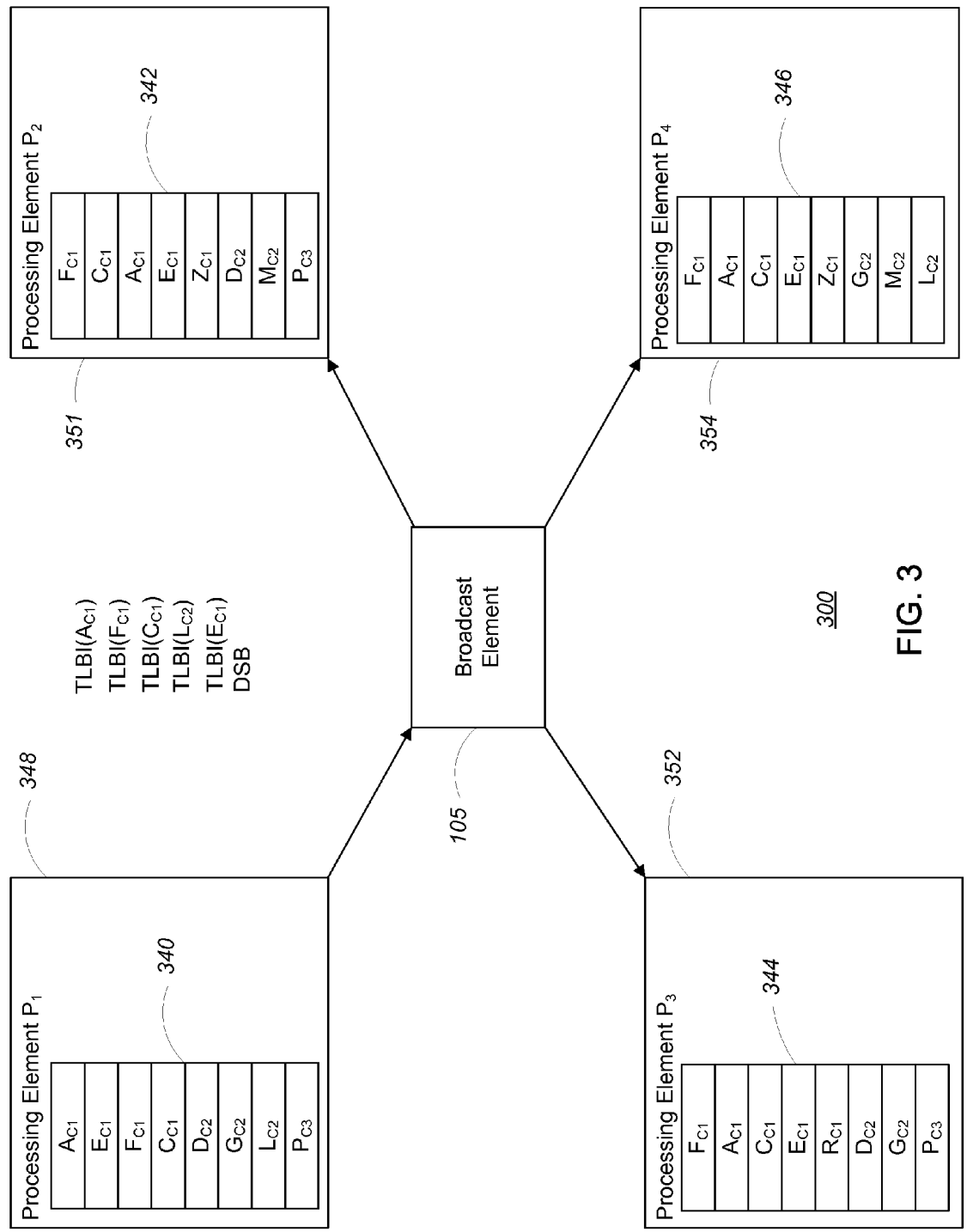
FIG. 3 is a first simplified view of the computing system of FIG. 1.

Referring to FIG. 3, a simplified version 300 of the computing system 100 includes four processing elements (i.e., a first processing element 348, a second processing element 351, a third processing element 352, and a fourth processing element 354) and the broadcast element 105.

Each processing element includes a TLB (i.e., the first processing element 348 includes a first TLB 340, the second processing element 351 includes a second TLB 342, the third processing element 352 includes a third TLB 344, and the fourth processing element 354 includes a fourth TLB 346). For the sake of simplicity, the four TLBs 340, 342, 344, 346 are generically represented, without specifying whether they are data TLBs or instruction TLBs. This generic representation of the four TLBs is valid since the TLB management techniques described below are the same regardless of whether the four TLBs are data TLBs or instruction TLBs. Each of the TLBs 340, 342, 344, 346 includes a number of TLB entries, each including a mapping between a virtual memory address and a physical memory address.

Each of the processing elements 348, 351, 352, 354 is in communication with the broadcast element 105, through which they are able to communicate with one another. While not explicitly shown in the figure, all communications between the processing elements and the broadcast element 105 take place over the processing bus 112. When a broadcast TLBI instruction for a mapping is issued at the first processing element 348, a corresponding TLBI instruction for the mapping is sent from the first processing element 348 to the broadcast element 105. The broadcast element 105 sends the TLBI instruction to each of the other, remote processing elements 351, 352, 354. Upon completion of the TLBI instruction at each of the remote processing elements 351, 352, 354, they each send an acknowledgement back to the first processing element 348 via the broadcast element 105.

In an exemplary scenario which illustrates the operation of broadcast TLBI instructions in the computing system 300, the first processing element 348 issues five broadcast TLBI instructions in a row, followed by a DSB (data synchronization barrier) instruction as follows:

$TLBI_B(A_{C1})$
$TLBI_B(F_{C1})$
$TLBI_B(C_{C1})$
$TLBI_B(L_{C2})$
$TLBI_B(E_{C1})$
DSB

In the above series of instructions, $TLBI_B$ represents a broadcast TLBI instruction. The arguments provided for each of the broadcast TLBI instructions include a reference to a mapping (or a virtual address corresponding to a mapping) and its associated context. For example, the first instruction, $TLBI_B(A_{C1})$, is a broadcast TLBI instruction for invalidating any TLB entries for the mapping A, which is associated with the context C1. In some examples, the context is provided as an ASID (i.e., a process identifier) which can be specified along with the virtual address in a register. In some examples, the context is provided as a VMID (virtual machine identifier) that can be provided from a system control register within the processor. In some examples, the context is provided as an Exception level that is encoded in a TLBI instruction opcode. The DSB instruction causes the first processing element 348 to halt processing until all of the $TLBI_B$ instructions issued prior to the issuance of the DSB are complete. In some examples, the DSB instruction is satisfied once an acknowledgement (e.g., an ACK) of completion of each $TLBI_B$ instruction is received from all of the remote processing elements (i.e., processing elements 351, 352, 354) at the first processing element 348.

Figure 4:
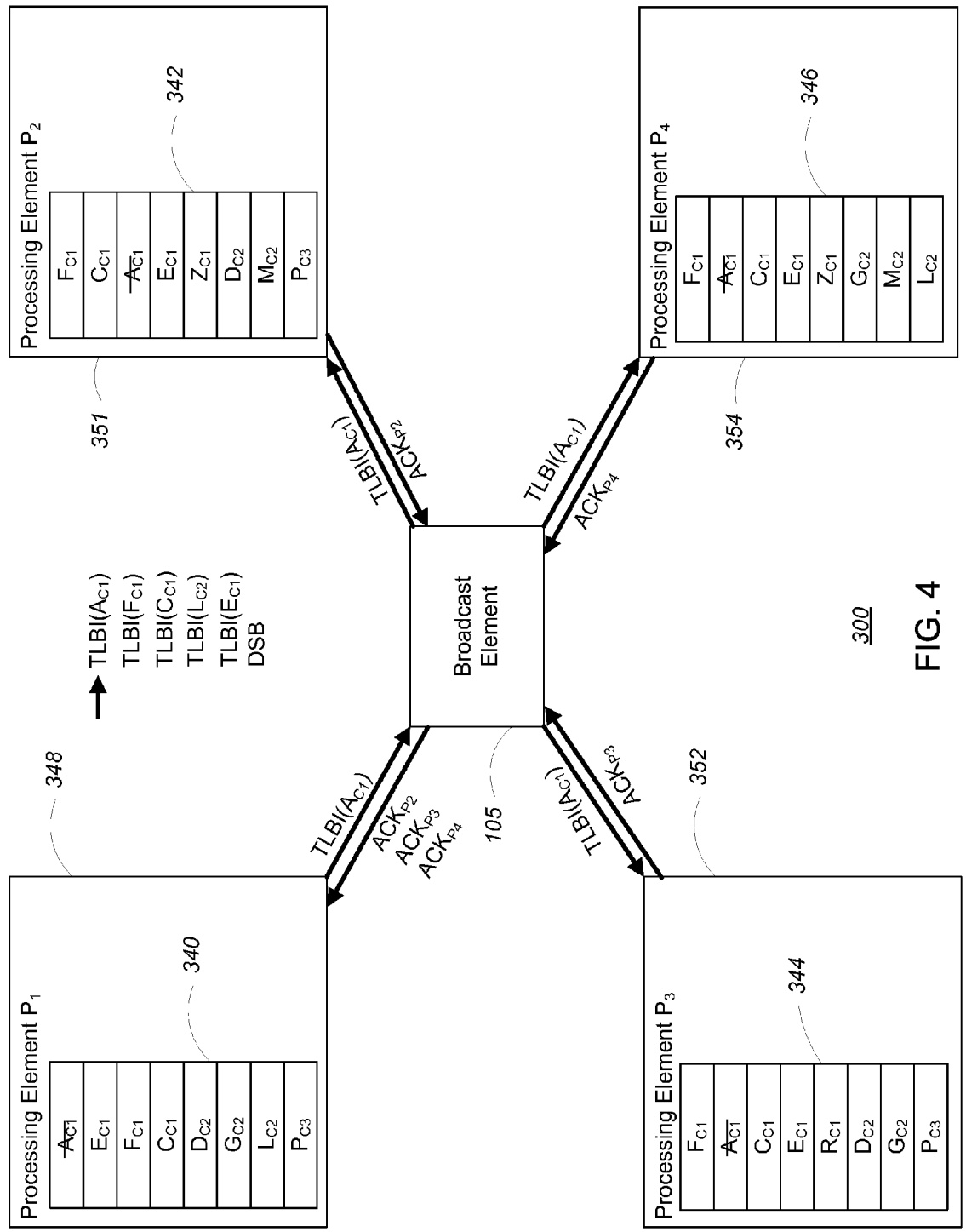
FIG. 4 is the computing system of FIG. 3 executing a first broadcast TLBI instruction.

Referring to FIG. 4, when the first instruction, $TLBI_B$ $(A_{C1})$ is issued at the first processing element 348, the $TLBI_B(A_{C1})$ instruction causes invalidation of the $A_{C1}$ entry in the first TLB 340 of the first processing element 348. Since $TLBI_B(A_{C1})$ is a broadcast TLBI instruction, the first processing element 348 sends a corresponding TLBI instruction, $TLBI(A_{C1})$ to the broadcast element 105. The broadcast element 105 then sends the $TLBI(A_{C1})$ instruction to each of the remote processing elements 351, 352, 354. The $TLBI(A_{C1})$ instruction causes invalidation of the $A_{C1}$ mapping in the TLBs of each of the remote processing elements 351, 352, 354. Each of the remote processing elements 351, 352, 354 then sends an acknowledgement (e.g., $ACK_{P2}$, $ACK_{P3}$, $ACK_{P4}$) that the $TLBI(A_{C1})$ instruction has completed at the processing element to the broadcast element 105. The broadcast element 105 sends the acknowledgements to the first processing element 348. Once the first processing element 348 receives acknowledgements that all of the remote processing elements, 351, 352, 354 have completed the $TLBI(A_{C1})$ instruction, the first processing element 348 marks the $TLBI_B(A_{C1})$ instruction as complete.

Figure 5:
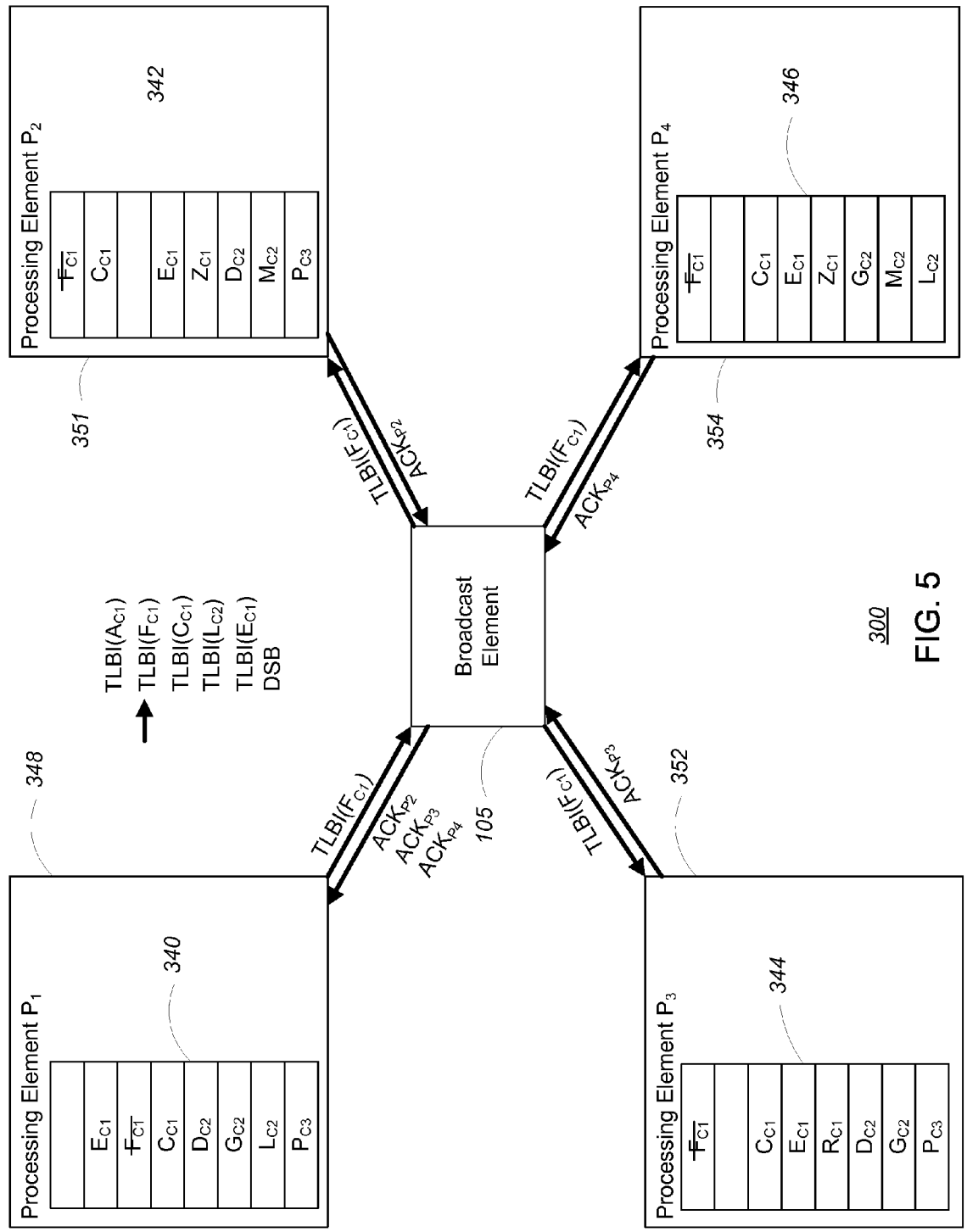
FIG. 5 is the computing system of FIG. 3 executing a second broadcast TLBI instruction.

Referring to FIG. 5, when the second instruction, $TLBI_B$ ($F_{C1}$) is issued at the first processing element 348, the $TLBI_B(F_{C1})$ instruction causes invalidation of the $F_{C1}$ entry in the first TLB 340 of the first processing element 348. Since $TLBI_B(F_{C1})$ is a broadcast TLBI instruction, the first processing element 348 sends a corresponding TLBI instruction, $TLBI(F_{C1})$ to the broadcast element 105. The broadcast element 105 then sends the $TLBI(F_{C1})$ instruction to each of the remote processing elements 351, 352, 354. The TLBI ($F_{C1}$) instruction causes invalidation of the $F_{C1}$ mapping in the TLBs of each of the remote processing elements 351, 352, 354. Each of the remote processing elements 351, 352, 354 then sends an acknowledgment (e.g., $ACK_{P2}$, $ACK_{P3}$, $ACK_{P4}$) that the $TLBI(F_{C1})$ instruction has completed at the processing element to the broadcast element 105. The broadcast element 105 then sends the acknowledgements to the first processing element 348. Once the first processing element 348 receives acknowledgements that all of the remote processing elements, 351, 352, 354 have completed the $TLBI(F_{C1})$ instruction, the first processing element 348 marks the $TLBI_B(F_{C1})$ instruction as complete.

Figure 6:
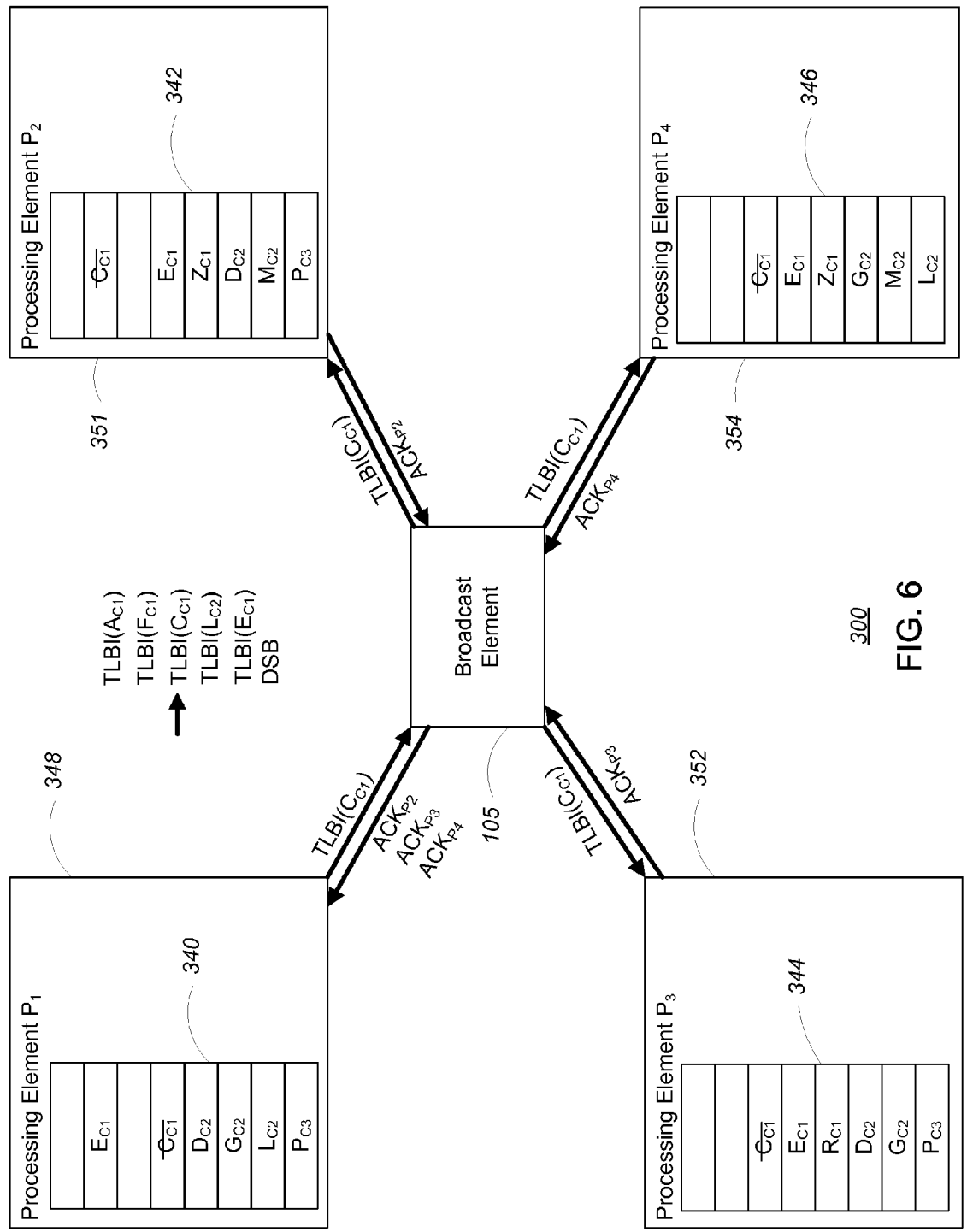
FIG. 6 is the computing system of FIG. 3 executing a third broadcast TLBI instruction.

Referring to FIG. 6, when the third instruction, $TLBI_B$ ($C_{C1}$) is issued at the first processing element 348, the $TLBI_B(C_{C1})$ instruction causes invalidation of the $C_{C1}$ entry in the first TLB 340 of the first processing element 348. Since $TLBI_B(C_{C1})$ is a broadcast TLBI instruction, the first processing element 348 sends a corresponding TLBI instruction, $TLBI(C_{C1})$ to the broadcast element 105. The broadcast element 105 then sends the $TLBI(C_{C1})$ instruction to each of the remote processing elements 351, 352, 354. The TLBI ($C_{C1}$) instruction causes invalidation of the $C_{C1}$ mapping in the TLBs of each of the remote processing elements 351, 352, 354. Each of the remote processing elements 351, 352, 354 then sends an acknowledgment (e.g., $ACK_{P2}$, $ACK_{P3}$, $ACK_{P4}$) that the $TLBI(C_{C1})$ instruction has completed at the processing element to the broadcast element 105. The broadcast element 105 then sends the acknowledgements to the first processing element 348. Once the first processing element 348 receives acknowledgements that all of the remote processing elements, 351, 352, 354 have completed the $TLBI(C_{C1})$ instruction, the first processing element 348 marks the $TLBI_B(C_{C1})$ instruction as complete.

Figure 7:
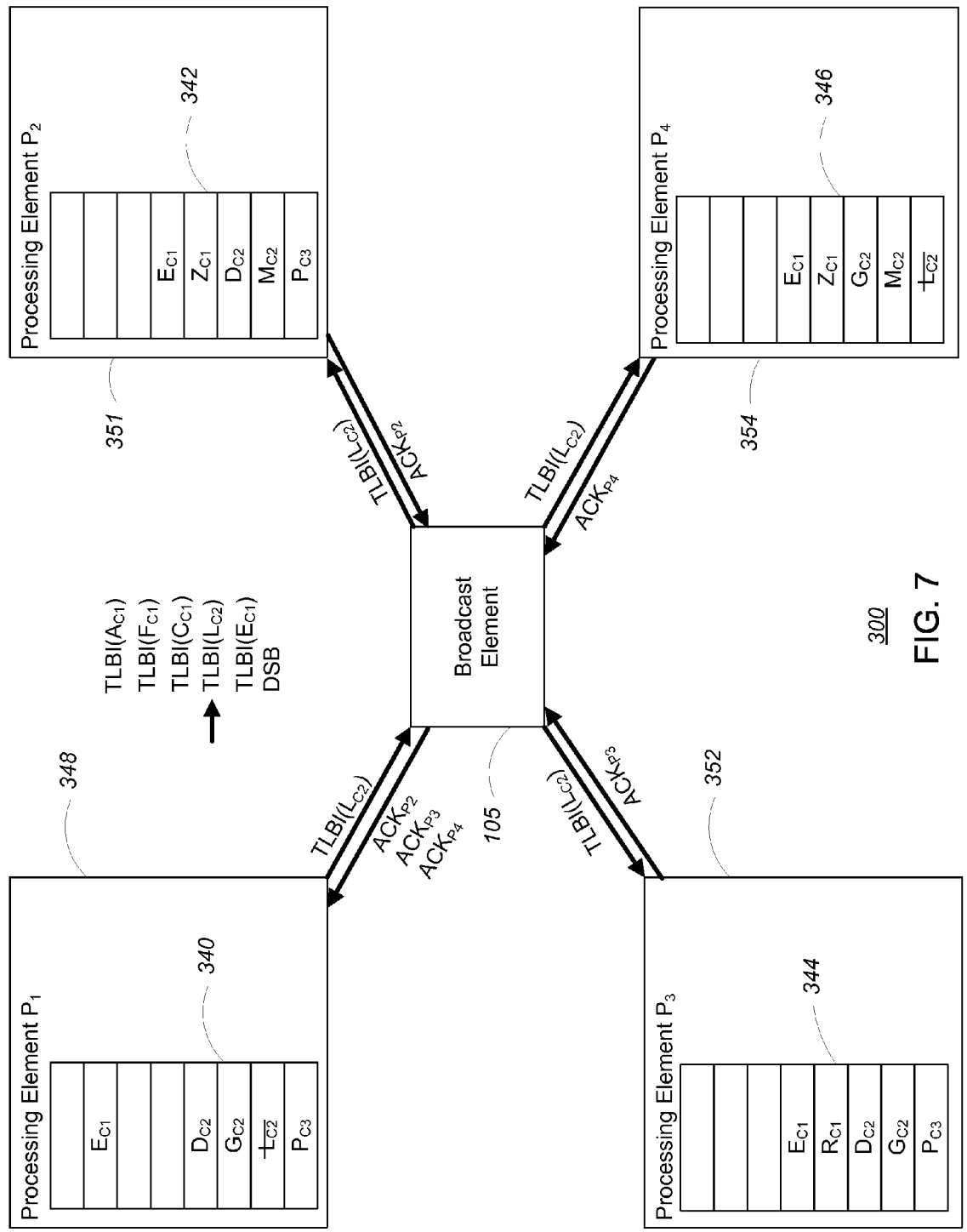
FIG. 7 is the computing system of FIG. 3 executing a fourth broadcast TLBI instruction.

Referring to FIG. 7, when the fourth instruction, $TLBI_B$ ($L_{C2}$) is issued at the first processing element 348, the $TLBI_B(L_{C2})$ instruction causes invalidation of the $L_{C2}$ entry in the first TLB 340 of the first processing element 348. Since $TLBI_B(L_{C2})$ is a broadcast TLBI instruction, the first processing element 348 sends a corresponding TLBI instruction, $TLBI(L_{C2})$ to the broadcast element 105. The broadcast element 105 then sends the $TLBI(L_{C2})$ instruction to each of the remote processing elements 351, 352, 354. The TLBI ($L_{C2}$) instruction causes invalidation of the $L_{C2}$ mapping in the TLBs of each of the remote processing elements 351, 352, 354. Each of the remote processing elements 351, 352, 354 then sends an acknowledgment (e.g., $ACK_{P2}$, $ACK_{P3}$, $ACK_{P4}$) that the $TLBI(L_{C2})$ instruction has completed at the processing element to the broadcast element 105. The broadcast element 105 then sends the acknowledgements to the first processing element 348. Once the first processing element 348 receives acknowledgements that all of the remote processing elements, 351, 352, 354 have completed the $TLBI(L_{C2})$ instruction, the first processing element 348 marks the $TLBI_B(L_{C2})$ instruction as complete.

Figure 8:
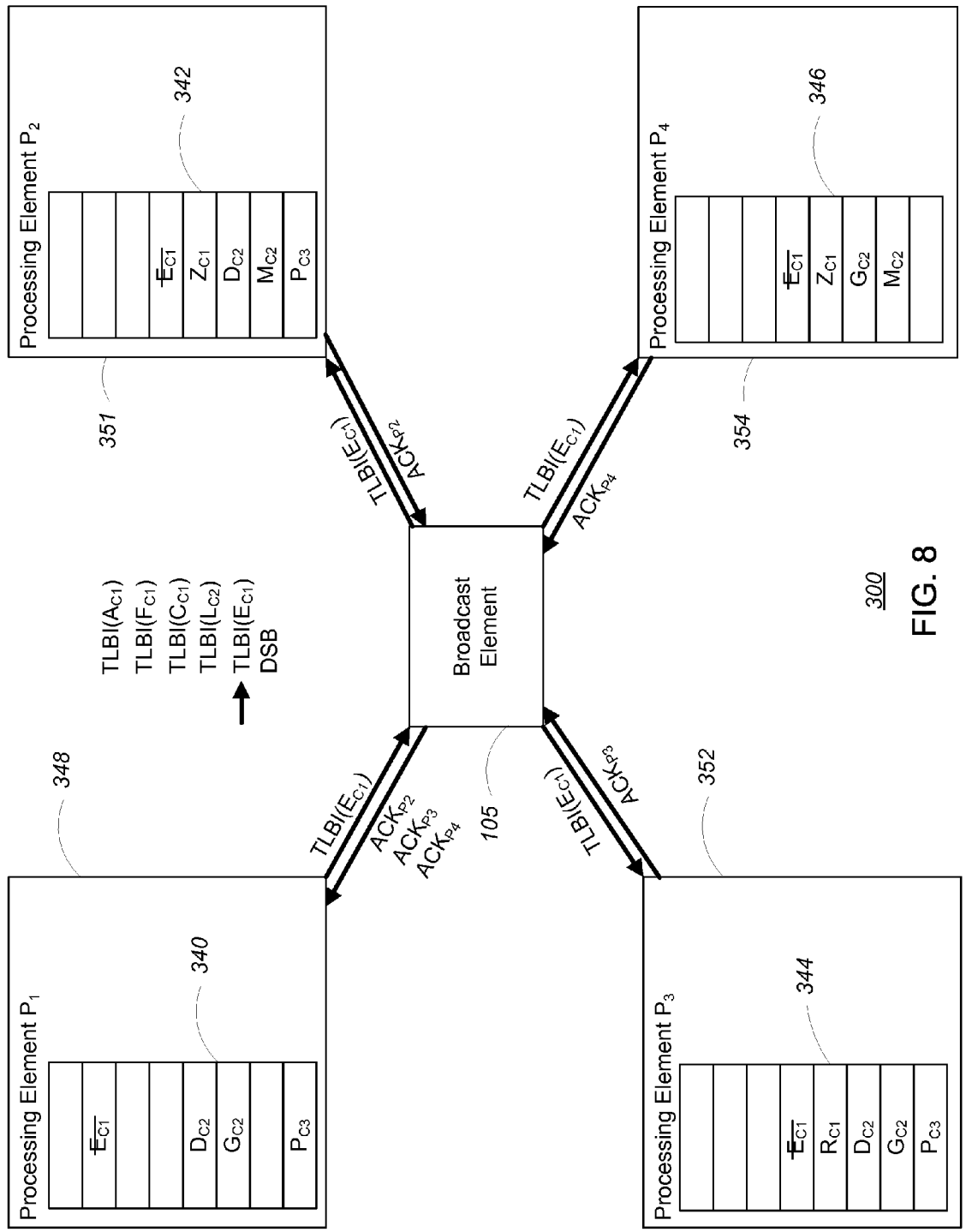
FIG. 8 is the computing system of FIG. 3 executing a fifth broadcast TLBI instruction.

Referring to FIG. 8, when the fifth instruction, $TLBI_B$ ($E_{C1}$) is issued at the first processing element 348, the $TLBI_B(E_{C1})$ instruction causes invalidation of the $E_{C1}$ entry in the first TLB 340 of the first processing element 348. Since $TLBI_B(E_{C1})$ is a broadcast TLBI instruction, the first processing element 348 sends a corresponding TLBI instruction, $TLBI(E_{C1})$ to the broadcast element 105. The broadcast element 105 then sends the $TLBI(E_{C1})$ instruction to each of the remote processing elements 351, 352, 354. The TLBI ($E_{C1}$) instruction causes invalidation of the $E_{C1}$ mapping in the TLBs of each of the remote processing elements 351, 352, 354. Each of the remote processing elements 351, 352, 354 then sends an acknowledgment (e.g., $ACK_{P2}$, $ACK_{P3}$, $ACK_{P4}$) that the $TLBI(E_{C1})$ instruction has completed at the processing element to the broadcast element 105. The broadcast element 105 then sends the acknowledgements to the first processing element 348. Once the first processing element 348 receives acknowledgements that all of the remote processing elements, 351, 352, 354 have completed the $TLBI(E_{C1})$ instruction, the first processing element 348 marks the $TLBI_B(E_{C1})$ instruction as complete.

Figure 9:
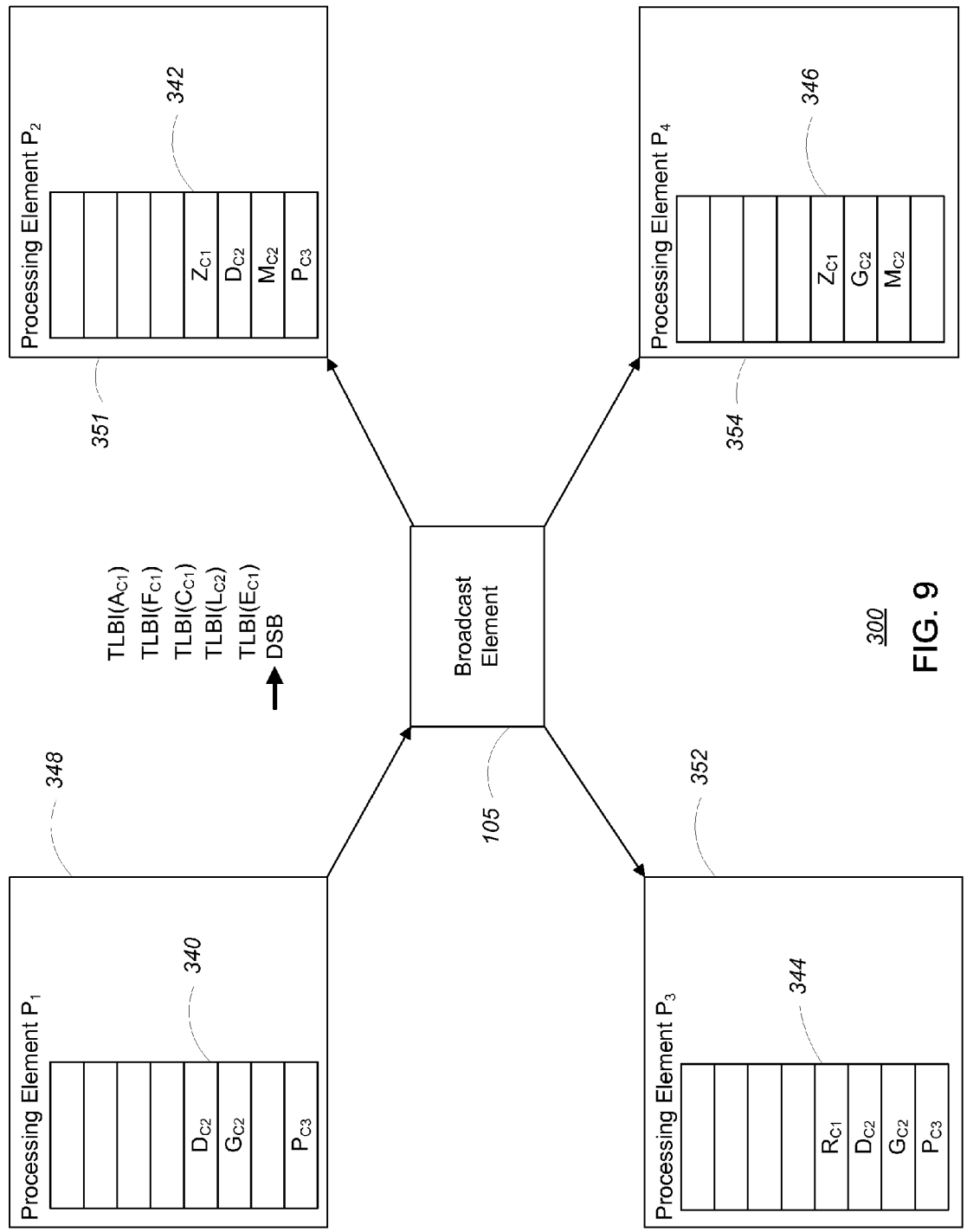
FIG. 9 is the computing system of FIG. 3 executing a DSB instruction.

Finally, referring to FIG. 9, when the sixth instruction, DSB is issued at the first processing element 348, the first processing element 348 halts processing until all of the broadcast TLBI instructions issued prior to issuance of the DSB are marked as complete (i.e., until all of the acknowledgements have been received from all of the remote processing elements, 351, 352, 354). Once all of the broadcast TLBI instructions issued prior to the issuance of the DSB instruction are marked as complete, the first processing element 348 resumes processing. Note that the first processing element 348 does not halt processing after issuance of each individual broadcast TLBI instruction and wait to receive acknowledgements that the broadcast TLBI instruction has completed at all remote processing elements before moving on and issuing the next broadcast TLBI instruction. Indeed, it is only the DSB instruction that halts processing at the first processing element 348.

As can be seen in the above example, a potentially large number of TLBI instructions and TLBI completion acknowledgements are sent between processing elements and the broadcast element 105 over the processing bus 112, resulting in an undesirable consumption of bandwidth on the processing bus 112. Furthermore, waiting for such a large number of TLBI instructions to complete at the remote processing elements 351, 352, 354 can incur significant time penalties.

2.3.2 Optimizing Broadcast TLBI Instructions

To reduce the number of TLBI instructions and TLBI completion acknowledgements sent between the processing elements and the broadcast element 105 over the processing bus, two optimizations are made to the way in which broadcast TLBI instructions are processed by the processing elements.

First, when a broadcast TLBI instruction for a mapping is issued at a given processing element, the corresponding TLBI instruction that is sent to the remote processing elements is converted from a TLBI instruction that invalidates the mapping to a TLBI instruction that invalidates an entire context associated with the mapping. That is, the TLBI instruction that is broadcast to the remote processing elements potentially causes invalidation of a number of TLB entries for mappings associated with the context at the remote cores, rather than just causing invalidation of an entry for the mapping at the remote cores. This step of invalidating an entire context on the remote cores is sometimes referred to as over-invalidation.

Second, after a TLBI instruction for a mapping causes invalidation of an entire context at the TLBs of the remote cores, in some cases, the processor suppresses broadcasting of subsequent TLBI instructions for invalidating mappings that are associated with the context that was previously invalidated at the TLBs of the remote cores. Specifically, any series of TLBI instructions for mappings that are associated with the previously invalidated context and are issued immediately after the TLBI instruction that caused invalidation of the context at the remote cores are suppressed.

By suppressing the broadcasting of TLBI instructions for mappings whose associated contexts are already invalidated at the remote cores, the number of TLBI instructions that are broadcast over the processing bus and the number of TLBI acknowledgements that are sent over the processing bus is reduced, thereby reducing consumption of bandwidth on the processing bus. Furthermore, the time spent waiting for such a large number of TLBI instructions to complete at the remote processing elements is reduced.

2.3.2.1 Optimized Broadcast TLBI Instructions Example

Figure 10:
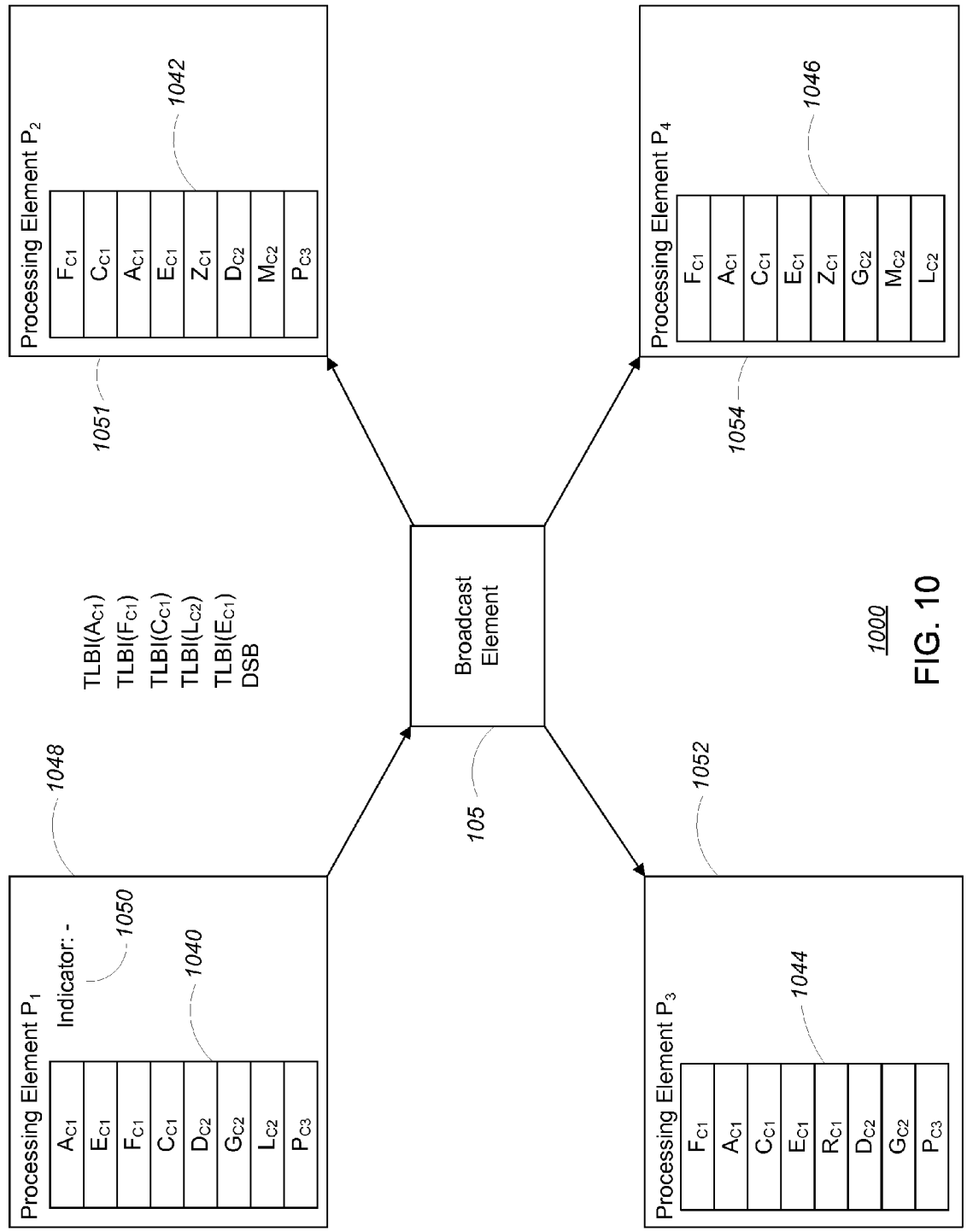
FIG. 10 is a second simplified view of the computing system of FIG. 1.

Referring to FIG. 10, another simplified version 1000 of the computing system 100 includes four processing elements 1002 (i.e., a first processing element 1048, a second processing element 1051, a third processing element 1052, and a fourth processing element 1054) and the broadcast element 105.

Each processing element includes a TLB (i.e. the first processing element 1048 includes a first TLB 1040, the second processing element 1051 includes a second TLB 1042, the third processing element 1052 includes a third TLB 1044, and the fourth processing element 1054 includes a fourth TLB 1046) and a context indicator 1050. Each of the TLBs 1040, 1042, 1044, 1046 includes a number of TLB entries, each including a mapping between a virtual memory address and a physical memory address. Again, for the sake of simplicity, the four TLBs 1040, 1042, 1044, 1046 are generically represented, without specifying whether they are data TLBs or instruction TLBs.

The context indicator 1050 includes an indication of a context associated with the last $TLBI_B$ instruction issued at the processing element. Initially, the context indicator has a blank value of '-'. Note that in the figure, the context indicator 1050 is only shown in the first processing element 1048 since the example focuses only on instructions issued at the first processing element 1048. However, in general, each processing element 1002 will include a context indicator 1050.

Each of the processing elements 1002 is in communication with the broadcast element 105, through which they are able to communicate with one another. While not explicitly shown in the figure, all communications between the processing elements and the broadcast element 105 take place over the processing bus 112. When a broadcast TLBI instruction for a mapping is issued at the first processing element 1048, a TLBI instruction for a context associated with the mapping may be sent from the first processing element 1048 to the broadcast element 105. Any TLBI instructions received at the broadcast element 105 are sent to each of the other, remote processing elements, 1051, 1052, 1054. Upon completion of any TLBI instructions at each of the remote processing elements, 1051, 1052, 1054, they each send an acknowledgement back to the first processing element 1048 P1 via the broadcast element 105.

The same exemplary scenario used above is used to illustrate the operation of optimized broadcast TLBI instructions in the computing system 1000. In the exemplary scenario, the first processing element 1048 issues five broadcast TLBI instructions in a row, followed by a DSB (data synchronization barrier) instruction as follows:

$TLBI_B(A_{C1})$
$TLBI_B(F_{C1})$
$TLBI_B(C_{C1})$
$TLBI_B(L_{C2})$
$TLBI_B(E_{C1})$
DSB

Again, in the above series of instructions, $TLBI_B$ represents a broadcast TLBI instruction. The arguments provided for each of the broadcast TLBI instructions include a reference to a mapping (or a virtual address corresponding to a mapping) and its associated context. For example, the first instruction, $TLBI_B(A_{C1})$, is a broadcast TLBI instruction for invalidating any TLB entries for the mapping A, which is associated with the context C1.

The DSB instruction causes the first processing element 1048 to halt processing until all of the $TLBI_B$ instructions issued prior to the issuance of the DSB are complete.

Figure 11:
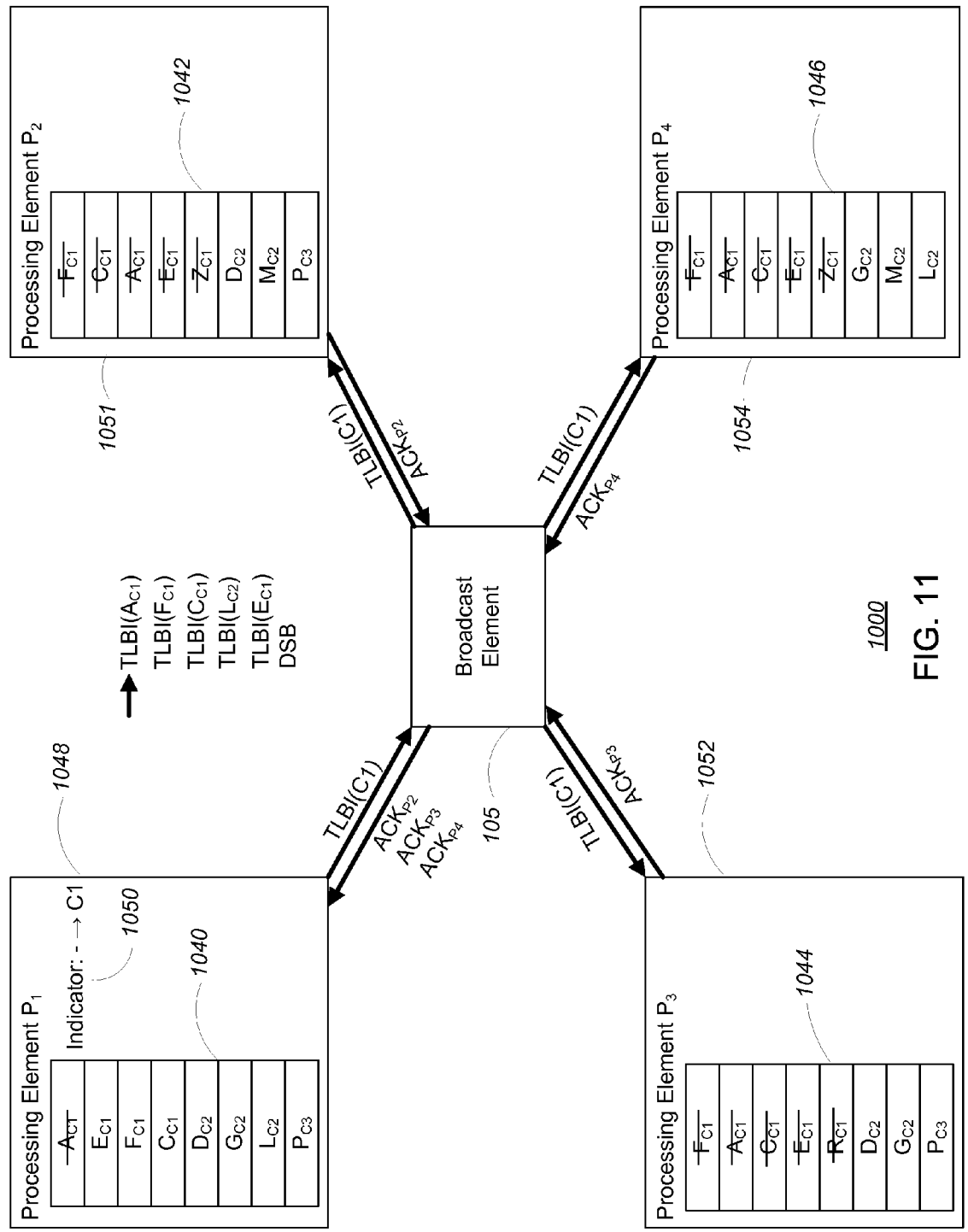
FIG. 11 is the computing system of FIG. 10 executing a first broadcast TLBI instruction.

Referring to FIG. 11, when the first instruction, $TLBI_B$ $(A_{C1})$ is issued at the first processing element 1048 the $TLBI_B(A_{C1})$ instruction causes invalidation of the $A_{C1}$ entry in the first TLB 1040 of the first processing element 1048. The first processing element 1048 then checks the context indicator 1050 to determine whether the context associated with the mapping for the last issued broadcast TLBI instruction is the same as the context associated with the $A_{C1}$ mapping. Since no broadcast TLBI instruction was issued prior to the first instruction, the first processing element 1048 determines that the value of the context indicator 1050 (i.e., '-') differs from the context associated with the $A_{C1}$ mapping (i.e., C1). Since the value of the context indicator 1050 and the context associated with the $A_{C1}$ mapping differ, the first processing element 1048 sends a TLBI instruction, TLBI(C1) to the broadcast element 105. The first processing element 1048 then changes the value of the context indicator 1050 to 'C1' to indicate that context C1 is the context associated with the most recently issued broadcast TLBI instruction.

The broadcast element 105 sends the TLBI(C1) instruction to the remote processing elements 1051, 1052, 1054, causing invalidation of all of the mappings associated with the context C1 in the TLBs of each of the remote processing elements 1051, 1052, 1054. Each of the remote processing elements 1051, 1052, 1054 then sends an acknowledgement (e.g., $ACK_{P2}$, $ACK_{P3}$, $ACK_{P4}$) that the TLBI(C1) instruction has completed at the processing element to the broadcast element 105. The broadcast element 105 sends the acknowledgements to the first processing element 1048. Once the first processing element 1048 receives acknowledgements that all of the remote processing elements, 1051, 1052, 1054 have completed the TLBI(C1) instruction, the first processing element 1048 marks the $TLBI_B(A_{C1})$ instruction as complete.

Figure 12:
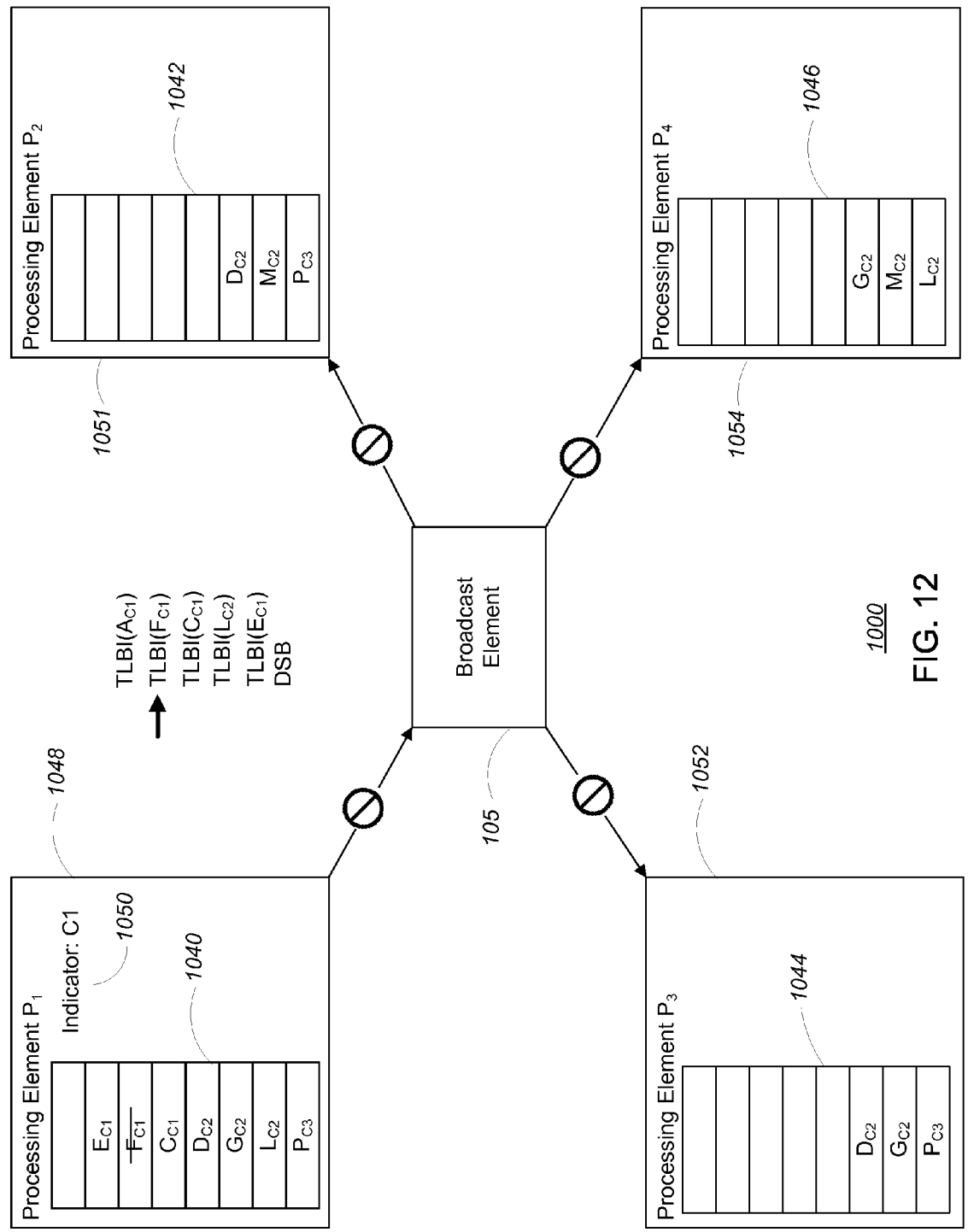
FIG. 12 is the computing system of FIG. 10 executing a second broadcast TLBI instruction.

Referring to FIG. 12, when the second instruction, $TLBI_B$ $(F_{C1})$ is issued at the first processing element 1048 the $TLBI_B(F_{C1})$ instruction causes invalidation of the $F_{C1}$ entry in the first TLB 1040 of the first processing element 1048. The first processing element 1048 then checks the value of the context indicator 1050 to determine whether it is the same as the context associated with the $F_{C1}$ mapping. In this case, the value of the context indicator 1050, C1, matches the context associated with the $F_{C1}$ mapping, C1. Having determined that the value of the context indicator 1050 matches the context associated with $F_{C1}$, the first processing element 1048 suppresses sending any TLBI instructions to the broadcast element 105 and the remote processing elements 1051, 1052, 1054. Indeed, since the entire C1 context was previously invalidated in the TLBs of the remote processor cores, any entries for $F_{C1}$ in the TLBs of the remote processor cores have already been invalidated, thereby obviating the need to send any additional TLBI instructions. The first processing element 1048 marks the $TLBI_B(F_{C1})$ instruction complete without having to wait for any acknowledgements from the remote processing elements. Since the value of the context indicator 1050 and the context associated with the $F_{C1}$ mapping match, no change is made to the context indicator 1050.

Figure 13:
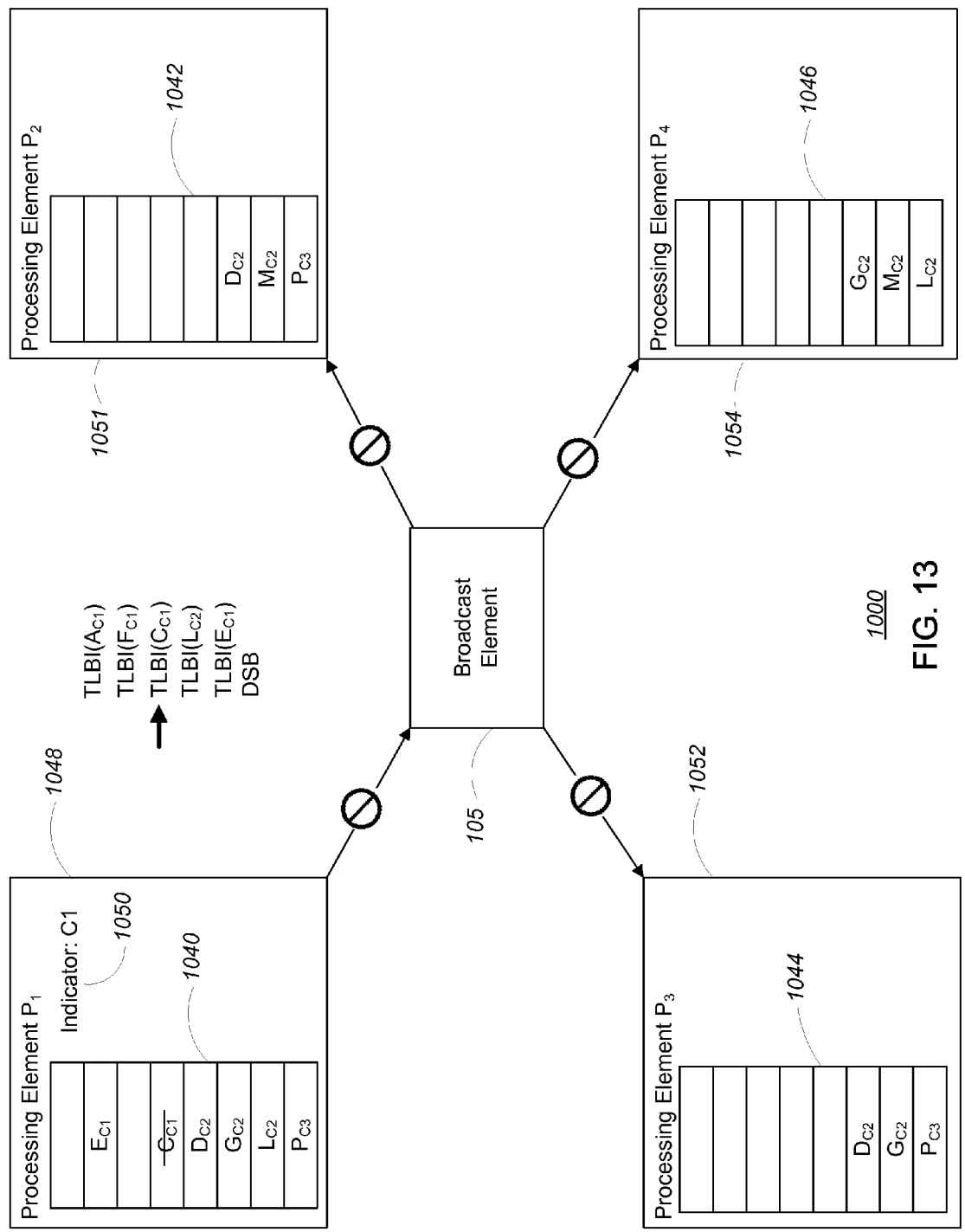
FIG. 13 is the computing system of FIG. 10 executing a third broadcast TLBI instruction.

Referring to FIG. 13, when the third instruction, $TLBI_B$ ($C_{C1}$) is issued at the first processing element 1048 the $TLBI_B(C_{C1})$ instruction causes invalidation of the $C_{C1}$ entry in the first TLB 1040 of the first processing element 1048. The first processing element 1048 then checks the value of the context indicator 1050 to determine whether it is the same as the context associated with the $C_{C1}$ mapping. In this case, the value of the context indicator 1050, C1, matches the context associated with the $C_{C1}$ mapping, C1. Having determined that the value of the context indicator 1050 matches the context associated with $C_{C1}$, the first processing element 1048 suppresses sending any TLBI instructions to the broadcast element 105 and the remote processing elements 1051, 1052, 1054. Again, since the entire C1 context was previously invalidated in the TLBs of the remote processor cores, any entries for $C_{C1}$ in the TLBs of the remote processor cores have already been invalidated, thereby obviating the need to send any additional TLBI instructions. The first processing element 1048 marks the $TLBI_B(C_{C1})$ instruction complete without having to wait for any acknowledgements from the remote processing elements. Since the value of the context indicator 1050 and the context associated with the $C_{C1}$ mapping match, no change is made to the context indicator 1050.

Figure 14:
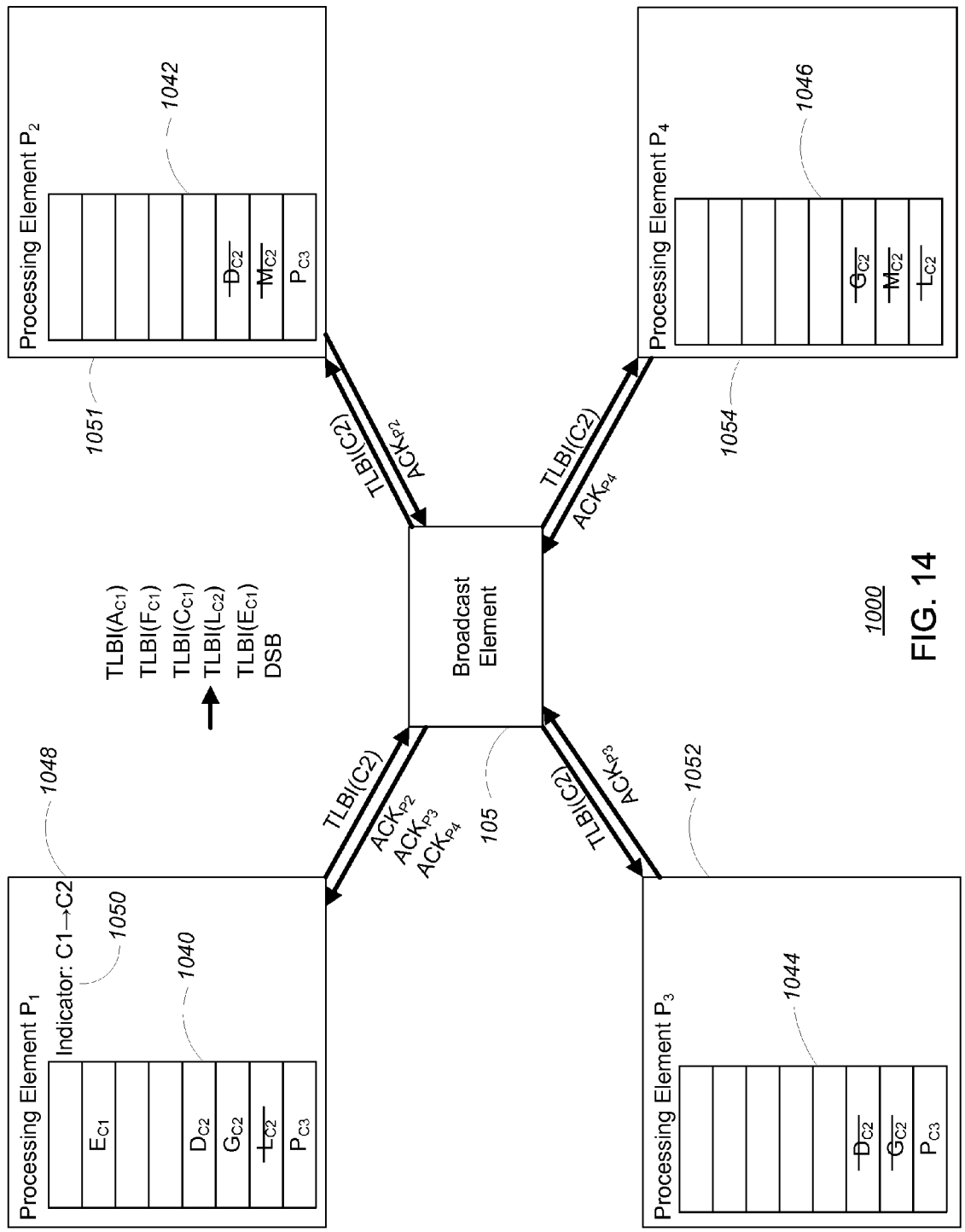
FIG. 14 is the computing system of FIG. 10 executing a fourth broadcast TLBI instruction.

Referring to FIG. 14, when the fourth instruction, $TLBI_B$ ($L_{C2}$) is issued at the first processing element 1048 the $TLBI_B(L_{C2})$ instruction causes invalidation of the $L_{C2}$ entry in the first TLB 1040 of the first processing element 1048. The first processing element 1048 then checks the context indicator 1050 to determine whether the context associated with the mapping for the last issued broadcast TLBI instruction is the same as the context associated with the $L_{C2}$ mapping. In this case, the first processing element 1048 determines that the value of the context indicator 1050 (i.e., 'C1') differs from the context associated with the $L_{C2}$ mapping (i.e., C2). Having determined that the value of the context indicator 1050 does not match the context associated with $L_{C2}$, the first processing element 1048 sends a TLBI instruction, TLBI(C2) to the broadcast element 105. The first processing element 1048 then changes the value of the context indicator 1050 to 'C2' to indicate that context C2 is the context associated with the most recently issued broadcast TLBI instruction.

The broadcast element 105 sends the TLBI(C2) instruction to the remote processing elements 1051, 1052, 1054, causing invalidation of all of the mappings associated with the context C2 in the TLBs of each of the remote processing elements 1051, 1052, 1054. Each of the remote processing elements 1051, 1052, 1054 then sends an acknowledgement (e.g., $ACK_{P2}$, $ACK_{P3}$, $ACK_{P4}$) that the TLBI(C2) instruction has completed at the processing element to the broadcast element 105. The broadcast element 105 sends the acknowledgements to the first processing element 1048. Once the first processing element 1048 receives acknowledgements that all of the remote processing elements, 1051, 1052, 1054 have completed the TLBI(C2) instruction, the first processing element 1048 marks the $TLBI_B(L_{C2})$ instruction as complete.

Figure 15:
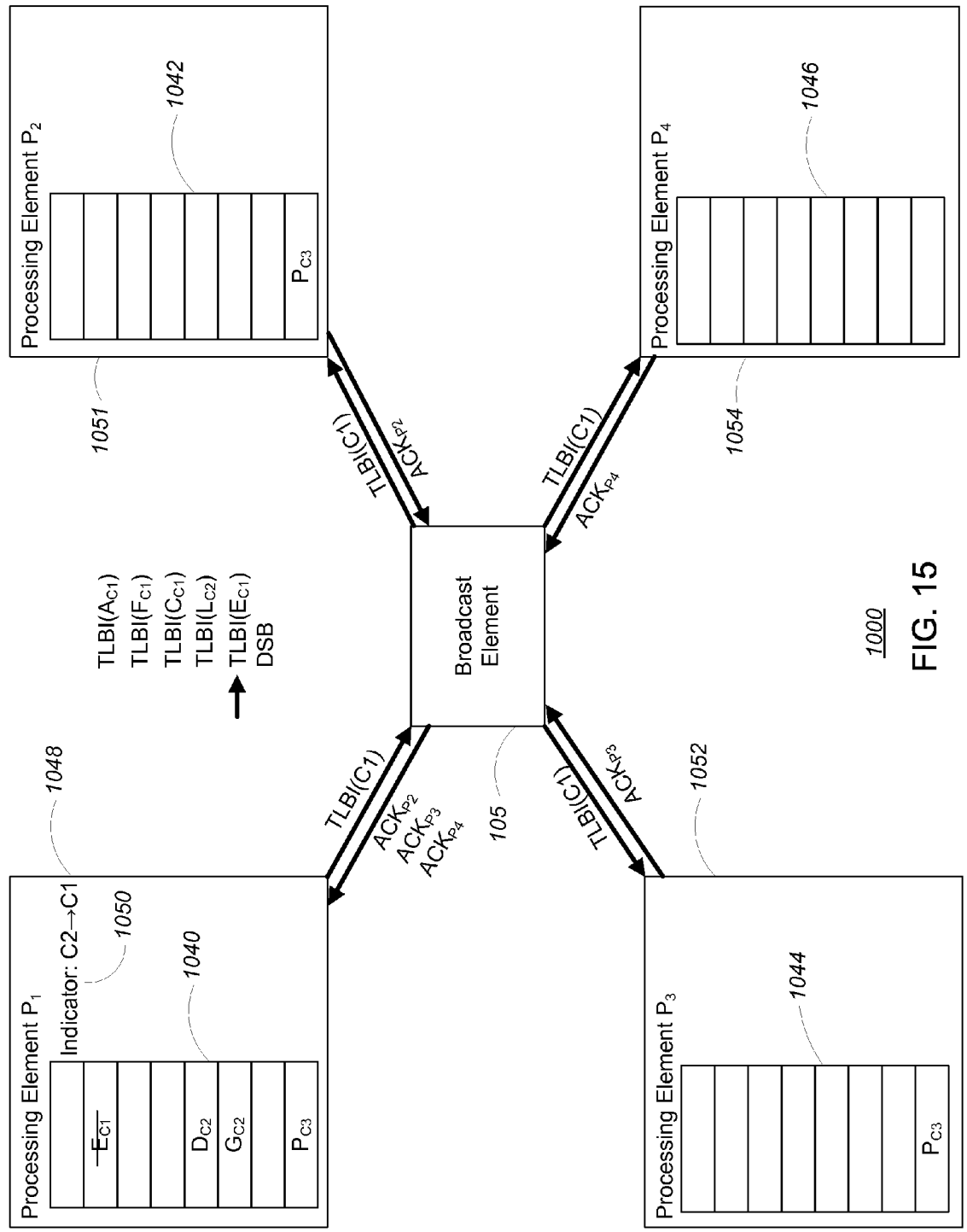
FIG. 15 is the computing system of FIG. 10 executing a fifth broadcast TLBI instruction.

Referring to FIG. 15, when the fifth instruction, $TLBI_B$ ($E_{C1}$) is issued at the first processing element 1048 the $TLBI_B(E_{C1})$ instruction causes invalidation of the $E_{C1}$ entry in the first TLB 1040 of the first processing element 1048. The first processing element 1048 then checks the context indicator 1050 to determine whether the context associated with the mapping for the last issued broadcast TLBI instruction is the same as the context associated with the $E_{C1}$ mapping. In this case, the first processing element 1048 determines that the value of the context indicator 1050 (i.e., 'C2') differs from the context associated with the $E_{C1}$ mapping (i.e., C1). Having determined that the value of the context indicator 1050 does not match the context associated with $E_{C1}$, the first processing element 1048 sends a TLBI instruction, TLBI(C1) to the broadcast element 105. The first processing element 1048 then changes the value of the context indicator 1050 to 'C1' to indicate that context C1 is the context associated with the most recently issued broadcast TLBI instruction.

The broadcast element 105 sends the TLBI(C1) instruction to the remote processing elements 1051, 1052, 1054, causing invalidation of all of the mappings associated with the context C1 in the TLBs of each of the remote processing elements 1051, 1052, 1054.

Each of the remote processing elements 1051, 1052, 1054 then sends an acknowledgement (e.g., $ACK_{P2}$, $ACK_{P3}$, $ACK_{P4}$) that the TLBI(C1) instruction has completed at the processing element to the broadcast element 105. The broadcast element 105 sends the acknowledgements to the first processing element 1048. Once the first processing element 1048 receives acknowledgements that all of the remote processing elements, 1051, 1052, 1054 have completed the TLBI(C1) instruction, the first processing element 1048 marks the $TLBI_B(E_{C1})$ instruction as complete.

Figure 16:
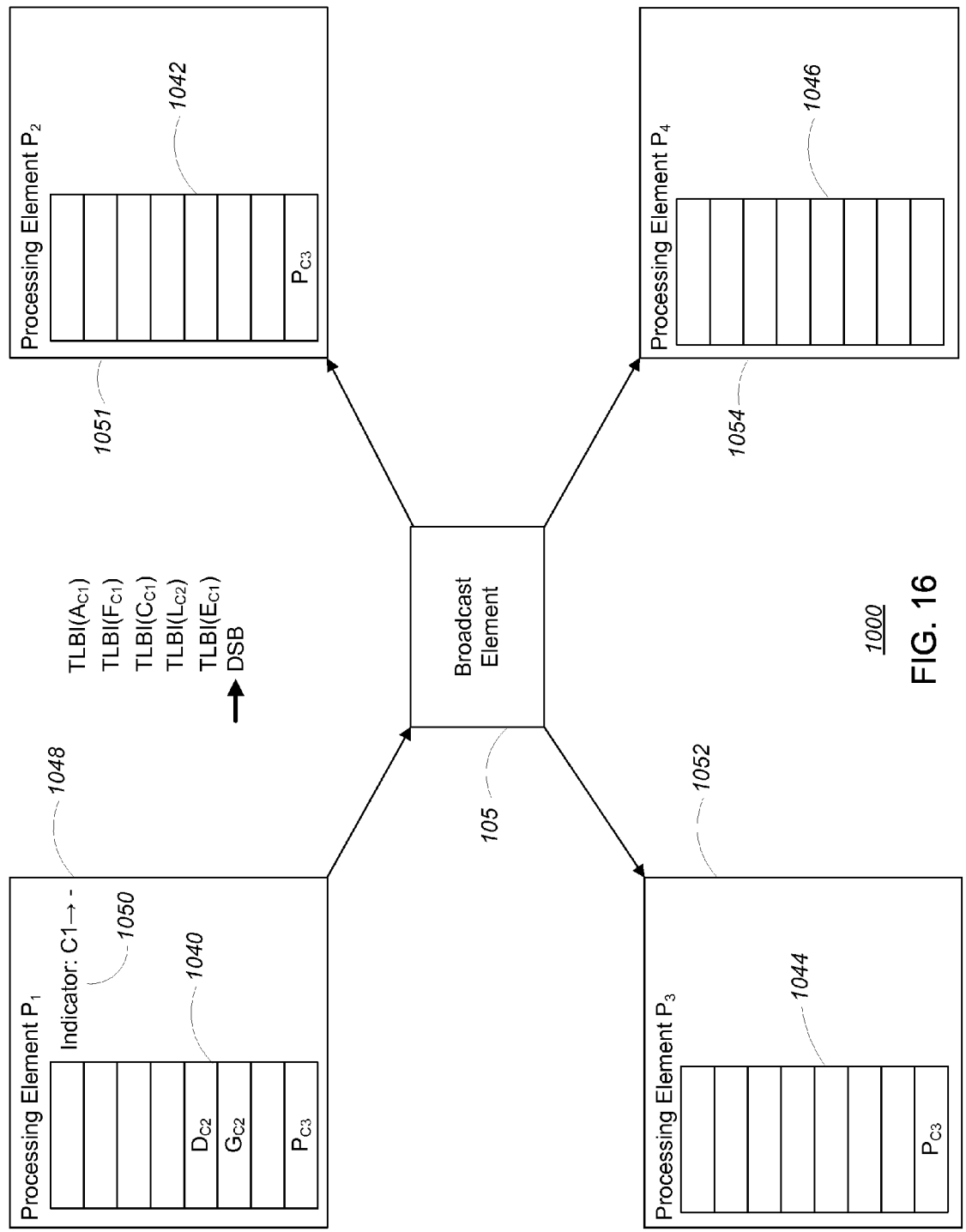
FIG. 16 is the computing system of FIG. 10 executing a DSB instruction.

Finally, referring to FIG. 16, when the seventh instruction, DSB is issued at the first processing element 1048, the first processing element 1048 halts processing until all of the broadcast TLBI instructions issued prior to issuance of the DSB are marked as complete (i.e., until all of the acknowledgements have been received from all of the remote processing elements, 1051, 1052, 1054). Once all of the broadcast TLBI instructions issued prior to the issuance of the DSB instruction are marked as complete, the first processing element 1048 resets the value of the context indicator 1050 to '-' and resumes processing. Note that the first processing element 1048 does not halt processing after issuance of each individual broadcast TLBI instruction and wait to receive acknowledgements that the broadcast TLBI instruction has completed at all remote processing elements before moving on and issuing the next broadcast TLBI instruction. Indeed, it is only the DSB instruction that halts processing at the first processing element 1048.

As is apparent from the above example, suppressing broadcasting of a series of TLBI instructions for mappings that are associated a previously invalidated context and are issued immediately after the TLBI instruction that caused invalidation of the context at the remote cores reduces the number of TLBI instructions that are broadcast over the processing bus and the number of TLBI acknowledgements that are sent over the processing bus.

3 Alternatives

The above examples of broadcast TLBI instruction optimization relate to suppressing a series of TLBI instructions for mappings that are associated with a previously invalidated context and are issued immediately after the broadcast TLBI instruction that caused invalidation of the context at the remote cores. However, in some examples, there is no requirement that the series of broadcast TLBI instructions for mappings that are associated with a previously invalidated context is a continuous series of TLBI instructions. That is, once a context has been invalidated once, any TLBI instructions associated with mappings that are associated with the invalidated context (and issued before issuance of a DSB) are suppressed. One way of accomplishing this is to maintain a valid/invalid indicator for each context. Another way is to maintain a list of invalidated contexts.

In some examples, the context indicator is implemented using one or more bits by the processing elements.

In the approaches described above, each TLBI that is broadcast from an originating core sends an acknowledgement that it has completed back to the originating core. However, in some examples, the TLBIs that are broadcast do not send any acknowledgements back to the originating cor. Instead, the DSB instruction ensures that all broadcast TLBI instructions have completed.

4 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Other embodiments are within the scope of the following claims.

What is claimed is:

1. A method for managing a plurality of translation lookaside buffers, each translation lookaside buffer including a plurality of translation lookaside buffer entries and being associated with a corresponding processing element of a plurality of processing elements, the method comprising:
   issuing, at a first processing element of the plurality of processing elements, a first instruction for invalidating one or more translation lookaside buffer entries associated with a first context in a first translation lookaside buffer associated with the first processing element, the issuing including:
   determining, at the first processing element, whether or not a state of an indicator indicates that all translation lookaside buffer entries associated with the first context in a second translation lookaside buffer associated with a second processing element are invalidated;
   if the state of the indicator indicates that all translation lookaside buffer entries associated with the first context in the second translation lookaside buffer are not invalidated:
      sending a corresponding instruction to the second processing element of the plurality of processing elements, the corresponding instruction causing invalidation of all translation lookaside buffer entries associated with the first context in the second translation lookaside buffer while maintaining one or more translation lookaside buffer entries associated with one or more other contexts in the second translation lookaside buffer, and
      changing a state of the indicator to indicate that all translation lookaside buffer entries associated with the first context in the second translation lookaside buffer are invalidated; and
   if the state of the indicator indicates that all translation lookaside buffer entries associated with the first context in the second translation lookaside buffer associated with the second processing element are invalidated:
      suppressing sending of any corresponding instructions for causing invalidation of any translation lookaside buffer entries associated with the first context in the second translation lookaside buffer to the second processing element.

2. The method of claim 1 further comprising, prior to determining whether or not the state of the indicator indicates that all translation lookaside buffer entries associated with the first context in the second translation lookaside buffer are invalidated,
   determining whether a second context associated with the indicator is the same as the first context associated with the first instruction; and
   if the second context differs from the first context, changing the state of the indicator to indicate that all translation lookaside buffer entries associated with the first context in the second translation lookaside buffer are not invalidated.

3. The method of claim 1 further comprising issuing a synchronization instruction at the first processing element, the synchronization instruction causing any pending translation lookaside buffer invalidation instructions at the first processing element to complete and, upon their completion, changing the state of the indicator to indicate that all translation lookaside buffer entries associated with the first context in the second translation lookaside buffer are not invalidated.

4. The method of claim 1 further comprising,
   determining, at the first processing element, whether or not a state of the indicator indicates that all translation lookaside buffer entries associated with the first context in a plurality of other translation lookaside buffers corresponding to a plurality of other processing elements of the plurality of processing elements are invalidated; and if the state of the indicator indicates that all translation lookaside buffer entries associated with the first context in the plurality of other translation lookaside buffers are not invalidated,
    sending the corresponding instruction to the plurality of other processing elements, the corresponding instruction causing invalidation of all translation lookaside buffer entries associated with the first context in the plurality of other translation lookaside buffers; and
if the state of the indicator indicates that all translation lookaside buffer entries associated with the first context in the plurality of other translation lookaside buffers are invalidated:
    suppressing sending of any corresponding instructions for causing invalidation of any translation lookaside buffer entries associated with the first context in the plurality of other translation lookaside buffers to the second processing element.

5. The method of claim 1 further comprising generating the corresponding instruction including converting the first instruction for invalidating one or more translation lookaside buffer entries associated with the first context in the first translation lookaside buffer to the corresponding instruction for causing invalidation of all translation lookaside buffer entries associated with the first context in the second translation lookaside buffer.

6. The method of claim 1 wherein the state of the indicator is represented using a single bit.

7. The method of claim 1 wherein the first context includes an address space identifier (ASID).

8. The method of claim 1 wherein the first context includes a virtual machine identifier (VMID).

9. The method of claim 1 wherein the first context includes an exception level (EL).

10. The method of claim 1 further comprising receiving a synchronization message and changing the state of the indicator to indicate that all translation lookaside buffer entries associated with the first context in the second translation lookaside buffer are not invalidated in response to the synchronization message.

11. The method of claim 1 further comprising receiving an interrupt and changing the state of the indicator to indicate that all translation lookaside buffer entries associated with the first context in the second translation lookaside buffer are not invalidated in response to receiving the interrupt.

12. An apparatus comprising:
a plurality of processing elements, each associated with a corresponding translation lookaside buffer, each translation lookaside buffer including a plurality of translation lookaside buffer entries;
wherein a first processing element of the plurality of processing elements is configured to issue a first instruction for invalidating one or more translation lookaside buffer entries associated with a first context in a first translation lookaside buffer associated with the first processing element, the issuing including:
    determining, at the first processing element, whether or not a state of an indicator indicates that all translation lookaside buffer entries associated with the first context in a second translation lookaside buffer associated with a second processing element are invalidated;
    if the state of the indicator indicates that all translation lookaside buffer entries associated with the first context in the second translation lookaside buffer are not invalidated:
        sending a corresponding instruction to the second processing element of the plurality of processing elements, the corresponding instruction causing invalidation of all translation lookaside buffer entries associated with the first context in the second translation lookaside buffer while maintaining one or more translation lookaside buffer entries associated with one or more other contexts in the second translation lookaside buffer, and
        changing a state of the indicator to indicate that all translation lookaside buffer entries associated with the first context in the second translation lookaside buffer are invalidated; and
    if the state of the indicator indicates that all translation lookaside buffer entries associated with the first context in the second translation lookaside buffer associated with the second processing element are invalidated:
        suppressing sending of any corresponding instructions for causing invalidation of any translation lookaside buffer entries associated with the first context in the second translation lookaside buffer to the second processing element.

13. The apparatus of claim 12 wherein the issuing further includes, prior to determining whether or not the state of the indicator indicates that all translation lookaside buffer entries associated with the first context in the second translation lookaside buffer are invalidated,
    determining whether a second context associated with the indicator is the same as the first context associated with the first instruction; and
    if the second context differs from the first context, changing the state of the indicator to indicate that all translation lookaside buffer entries associated with the first context in the second translation lookaside buffer are not invalidated.

14. The apparatus of claim 12 wherein the first processing element is configured to issue a synchronization instruction, the synchronization instruction causing any pending translation lookaside buffer invalidation instructions at the first processing element to complete and, upon their completion, changing the state of the indicator to indicate that all translation lookaside buffer entries associated with the first context in the second translation lookaside buffer are not invalidated.

15. The apparatus of claim 12 wherein the first processing element is further configured to:
    determine whether or not a state of the indicator indicates that all translation lookaside buffer entries associated with the first context in a plurality of other translation lookaside buffers corresponding to a plurality of other processing elements of the plurality of processing elements are invalidated; and
    if the state of the indicator indicates that all translation lookaside buffer entries associated with the first context in the plurality of other translation lookaside buffers are not invalidated,
        send the corresponding instruction to the plurality of other processing elements, the corresponding instruction causing invalidation of all translation lookaside buffer entries associated with the first context in the plurality of other translation lookaside buffers; and
    if the state of the indicator indicates that all translation lookaside buffer entries associated with the first context in the plurality of other translation lookaside buffers are invalidated:
  suppress sending of any corresponding instructions for causing invalidation of any translation lookaside buffer entries associated with the first context in the plurality of other translation lookaside buffers to the second processing element.

16. The apparatus of claim 12 wherein the first processing element is configured to generate the corresponding instruction including converting the first instruction for invalidating one or more translation lookaside buffer entries associated with the first context in the first translation lookaside buffer to the corresponding instruction for causing invalidation of all translation lookaside buffer entries associated with the first context in the second translation lookaside buffer.

17. The apparatus of claim 12 wherein the state of the indicator is represented using a single bit.

18. The apparatus of claim 12 wherein the first context includes an address space identifier (ASID).

19. The apparatus of claim 12 wherein the first context includes a virtual machine identifier (VMID).

20. The apparatus of claim 12 wherein the first context includes an exception level (EL).

21. The apparatus of claim 12 wherein the first processing element is configured to receive a synchronization message and change the state of the indicator to indicate that all translation lookaside buffer entries associated with the first context in the second translation lookaside buffer are not invalidated in response to the synchronization message.

22. The apparatus of claim 12 wherein the first processing element is configured to receive an interrupt and change the state of the indicator to indicate that all translation lookaside buffer entries associated with the first context in the second translation lookaside buffer are not invalidated in response to receiving the interrupt.

23. The method of claim 1 wherein the indicator is associated with the first processing element.

24. The apparatus of claim 12 wherein the indicator is associated with the first processing element.

* * * * *